(12) United States Patent  
Suzuki et al.

(10) Patent No.: US 11,284,299 B2  
(45) Date of Patent: Mar. 22, 2022

(54) DATA PROCESSING APPARATUS, DATA PROCESSING METHOD, AND PROGRAM

(71) Applicant: Sony Corporation, Tokyo (JP)

(72) Inventors: Shiro Suzuki, Kanagawa (JP); Jun Matsumoto, Kanagawa (JP); Takahiro Watanabe, Tokyo (JP); Yuuki Matsumura, Saitama (JP); Chisato Kemmochi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/938,872

(22) Filed: Jul. 24, 2020

(65) Prior Publication Data

US 2020/0359263 A1 Nov. 12, 2020

Related U.S. Application Data

(63) Continuation of application No. 15/531,151, filed as application No. PCT/JP2015/082720 on Nov. 20, 2015, now Pat. No. 10,764,782.

(30) Foreign Application Priority Data

Dec. 4, 2014 (JP) .............................. JP2014-245854

(51) Int. Cl.
*H04W 28/06* (2009.01)
*G10L 19/00* (2013.01)
(Continued)

(52) U.S. Cl.
CPC ........... *H04W 28/065* (2013.01); *G10L 19/00* (2013.01); *H04L 13/08* (2013.01); *H04L 29/08* (2013.01);
(Continued)

(58) Field of Classification Search
CPC ....... G10L 19/00; H04L 13/08; H04L 67/322; H04L 47/30; H04N 21/2401;
(Continued)

(56) References Cited

U.S. PATENT DOCUMENTS 4,960,030 A * 10/1990 Fujimori .............. G10H 1/0041
84/609
7,567,270 B2 * 7/2009 Chapweske .............. H04N 7/15
348/14.08

(Continued)

FOREIGN PATENT DOCUMENTS

JP 2002-016658 A 1/2002
JP 2003-179580 A 6/2003
(Continued)

OTHER PUBLICATIONS

International Search Report and English translation thereof dated Dec. 22, 2015 in connection with International Application No. PCT/JP2015/082720.

(Continued)

*Primary Examiner* — Harry H Kim
(74) *Attorney, Agent, or Firm* — Wolf, Greenfield & Sacks, P.C.

(57) ABSTRACT

The present technology relates to a data processing apparatus, a data processing method, and a program that are capable of preventing output of data from being interrupted on a reception side, the data being wirelessly transmitted and received by the reception side.
Control information for controlling a method of using data is generated by a reception side, the data being wirelessly transmitted and received by the reception side, and the control information is added to data to generate data-with-control-information. A method of using data is controlled on the basis of control information included in data-with-control-information for controlling the method of using data, (Continued)

the data-with-control-information being acquired by adding the control information to data, the data-with-control-information being wirelessly transmitted, and data whose use method is controlled is output on the basis of the control information.

8 Claims, 22 Drawing Sheets

(51) Int. Cl.
| | |
|---|---|
| H04L 13/08 | (2006.01) |
| H04L 29/08 | (2006.01) |
| H04M 1/253 | (2006.01) |
| H04N 21/24 | (2011.01) |
| H04Q 11/00 | (2006.01) |
| H04L 12/835 | (2013.01) |
| H04N 19/152 | (2014.01) |
| H04W 28/10 | (2009.01) |
| H04L 65/40 | (2022.01) |
| H04L 67/61 | (2022.01) |
| H04L 47/30 | (2022.01) |

(52) U.S. Cl.
CPC .......... *H04L 67/322* (2013.01); *H04M 1/253* (2013.01); *H04N 21/2401* (2013.01); *H04Q 11/00* (2013.01); *H04L 47/30* (2013.01); *H04M 2201/30* (2013.01); *H04N 19/152* (2014.11); *H04Q 2213/031* (2013.01); *H04W 28/10* (2013.01)

(58) Field of Classification Search
CPC ................ H04N 19/152; H04M 1/253; H04M 2201/30; H04W 28/10; H04Q 2213/031; H04Q 11/00
See application file for complete search history.

(56) References Cited

U.S. PATENT DOCUMENTS

| | | | |
|---|---|---|---|
| 10,764,782 B2* | 9/2020 | Suzuki .................... | H04L 13/08 |
| 2002/0070941 A1 | 6/2002 | Peterson et al. | |
| 2003/0126238 A1 | 7/2003 | Kohno et al. | |
| 2007/0223660 A1 | 9/2007 | Dei et al. | |
| 2008/0249846 A1* | 10/2008 | Yonemoto .......... | G06F 16/9535 |
| | | | 705/14.53 |
| 2009/0240832 A1 | 9/2009 | Miyama et al. | |
| 2011/0141988 A1* | 6/2011 | Park .................... | H04L 1/0073 |
| | | | 370/329 |
| 2012/0173594 A1 | 7/2012 | Jogand-Coulomb et al. | |
| 2012/0257019 A1 | 10/2012 | Tsukagoshi | |
| 2013/0107890 A1 | 5/2013 | Hyoudou et al. | |
| 2014/0052454 A1* | 2/2014 | Lien ........................ | G10L 25/51 |
| | | | 704/500 |
| 2014/0241288 A1 | 8/2014 | Bae et al. | |
| 2014/0282769 A1 | 9/2014 | Salem et al. | |
| 2015/0110103 A1 | 4/2015 | Kullangal Sridhara et al. | |
| 2015/0281770 A1* | 10/2015 | Lim ................... | H04N 21/4343 |
| | | | 725/110 |
| 2016/0019021 A1* | 1/2016 | Lu ........................... | G06F 3/165 |
| | | | 700/94 |
| 2016/0142865 A1* | 5/2016 | Park .................... | H04L 65/1083 |
| | | | 455/41.1 |
| 2017/0150441 A1 | 5/2017 | Katayama et al. | |
| 2018/0288650 A1 | 10/2018 | Suzuki et al. | |

FOREIGN PATENT DOCUMENTS

| | | | |
|---|---|---|---|
| JP | 2003-235041 | A | 8/2003 |
| JP | 2004-241821 | A | 8/2004 |
| JP | 2005-006050 | A | 1/2005 |
| JP | 2005-157045 | A | 6/2005 |
| JP | 4256429 | B2 | 4/2009 |
| JP | 2012-100102 | A | 5/2012 |
| WO | WO 2005/099243 | A1 | 10/2005 |
| WO | WO 2008/047560 | A1 | 4/2008 |
| WO | WO 2014/178275 | A1 | 11/2014 |

OTHER PUBLICATIONS

Written Opinion and English translation thereof dated Dec. 22, 2015 in connection with International Application No. PCT/JP2015/082720.
International Preliminary Report on Patentability and English translation thereof dated Jun. 15, 2017 in connection with International Application No. PCT/JP2015/082720.
Extended European Search Report dated Jun. 25, 2018 in connection with European Application No. 15865032.5.
Japanese Office Action dated Aug. 29, 2019 in connection with Japanese Application No. 2016-462386 and English translation thereof.
Chinese Office Action dated Sep. 12, 2019 in connection with Chinese Application No. 201580064902.4 and English translation thereof.
Japanese Office Action dated Dec. 17, 2019 in connection with Japanese Application No. 2016-562386 and English translation thereof.
Extended European Search Report dated Jan. 16, 2020 in connection with European Application No. 19209463.9.

* cited by examiner

DATA PROCESSING APPARATUS, DATA PROCESSING METHOD, AND PROGRAM

CROSS-REFERENCE TO RELATED APPLICATIONS

The present application claims the benefit under 35 U.S.C. § 120 as a continuation application of U.S. application Ser. No. 15/531,151, filed on May 26, 2017, which claims the benefit under 35 U.S.C. § 371 as a U.S. National Stage Entry of International Application No. PCT/JP2015/082720, filed in the Japanese Patent Office as a Receiving Office on Nov. 20, 2015, which claims priority to Japanese Patent Application Number JP2014-245854, filed in the Japanese Patent Office on Dec. 4, 2014, each of which is hereby incorporated by reference in its entirety.

TECHNICAL FIELD

The present technology relates to a data processing apparatus, a data processing method, and a program, and particularly to a data processing apparatus, a data processing method, and a program that are capable of preventing output of data from being interrupted on a reception side that receives wirelessly transmitted data, for example.

BACKGROUND ART

For example, in a wireless transmission/reception system that wirelessly transmits/receives acoustic data such as music via Bluetooth (registered trademark) or the like, a transmission side that transmits acoustic data and a reception side that receives the acoustic data include respective buffers for temporarily storing the acoustic data in preparation for retransmitting the acoustic data.

Specifically, on the transmission side, acoustic data is stored in the buffer before being transmitted because the acoustic data is retransmitted in the case where transmission/reception of the acoustic data has failed, for example.

On the other hand, on the reception side, acoustic data from the transmission side is stored in the buffer and output of the acoustic data from the buffer is started after the storage amount of the buffer (amount of data stored in the buffer) reaches a certain level to prevent output of acoustic data and then output of sound from being interrupted in the case where transmission/reception of acoustic data has failed, for example.

The storage amount of the buffer of the transmission side and the reception side is changed in the case where transmission of acoustic data has failed and the acoustic data is retransmitted.

Further, the storage amount of the buffer of the transmission side and the reception side is changed in the case where processing on acoustic data is not in time on the transmission side when high-load processing is performed on the transmission side, for example.

Further, in the case where transmission/reception of acoustic data is temporarily stopped due to deterioration of the condition of a transmission path, for example, the storage amount of the buffer of the transmission side is increased and the storage amount of the buffer of the reception side is reduced. Then, after that, the storage amount of the buffer of the reception side is increased in the case where the condition of the transmission path is restored, transmission of the acoustic data is resumed, and a large amount of acoustic data stored in the buffer of the transmission side during stopping of the transmission/reception is successively transmitted.

As described above, in the case where the storage amount of the buffer of the transmission side and the reception side is changed (increased, decreased), a buffer overflow or underflow occurs in some cases. The buffer overflow or underflow on the transmission side and the reception side causes output of acoustic data on the reception side to be interrupted. As a result, sound break occurs.

In this regard, a technology for preventing sound break on the reception side due to the buffer underflow on the transmission side from occurring has been proposed (see, for example, Patent Literature 1).

CITATION LIST

Patent Literature

Patent Literature 1: Japanese Patent No. 4,256,429

DISCLOSURE OF INVENTION

Technical Problem

At present, for a wireless transmission/reception system, it is demanded to propose various technologies for preventing output of data on the receiving side from being interrupted.

The present technology has been made in view of the above circumstances to make it possible to prevent output of data from being interrupted on the reception side.

Solution to Problem

A first data processing apparatus or program according to the present technology is a data processing apparatus including a control information generation unit that generates control information for controlling a method of using data by a reception side, the data being wirelessly transmitted and received by the reception side; and a data generation unit that adds the control information to data to generate data-with-control-information, or a program that causes a computer to function as such a data processing apparatus.

A first data processing method according to the present technology is a data processing method, including: generating control information for controlling a method of using data on a reception side, the data being wirelessly transmitted and received by the reception side; and adding the control information to data to generate data-with-control-information.

In the first data processing apparatus, data processing method, and program according to the present technology, control information for controlling a method of using data is generated by a reception side, the data being wirelessly transmitted and received by the reception side, and the control information is added to data to generate data-with-control-information.

A second data processing apparatus or program according to the present technology is a data processing apparatus, including: a data control unit that controls a method of using data on the basis of control information included in data-with-control-information for controlling the method of using data, the data-with-control-information being acquired by adding the control information to data, the data-with-control-information being wirelessly transmitted; and a data output unit that outputs data whose use method is controlled, on the basis of the control information, or a program that causes a computer to function as such a data processing apparatus.

A second data processing method according to the present technology is a data processing method, including: controlling a method of using data on the basis of control information included in data-with-control-information for controlling the method of using data, the data-with-control-information being acquired by adding the control information to data, the data-with-control-information being wirelessly transmitted; and outputting data whose use method is controlled, on the basis of the control information.

In the second data processing apparatus, data processing method, and program according to the present technology, a method of using data is controlled on the basis of control information included in data-with-control-information for controlling the method of using data, the data-with-control-information being acquired by adding the control information to data, the data-with-control-information being wirelessly transmitted; and data whose use method is controlled is output, on the basis of the control information.

Note that the data processing apparatus may be an independent apparatus or may be an internal block configuring a single apparatus.

Further, the program can be provided by being transmitted via a transmission medium or being recorded in a recording medium.

Advantageous Effects of Invention

In accordance with the present technology, it is possible to prevent output of data from being interrupted on the reception side.

It should be noted that the effect described here is not necessarily limitative and may be any effect described in the present disclosure.

MODE(S) FOR CARRYING OUT THE INVENTION

<One Embodiment of Wireless Transmission/Reception System to which Present Technology is Applied>

Figure 1:
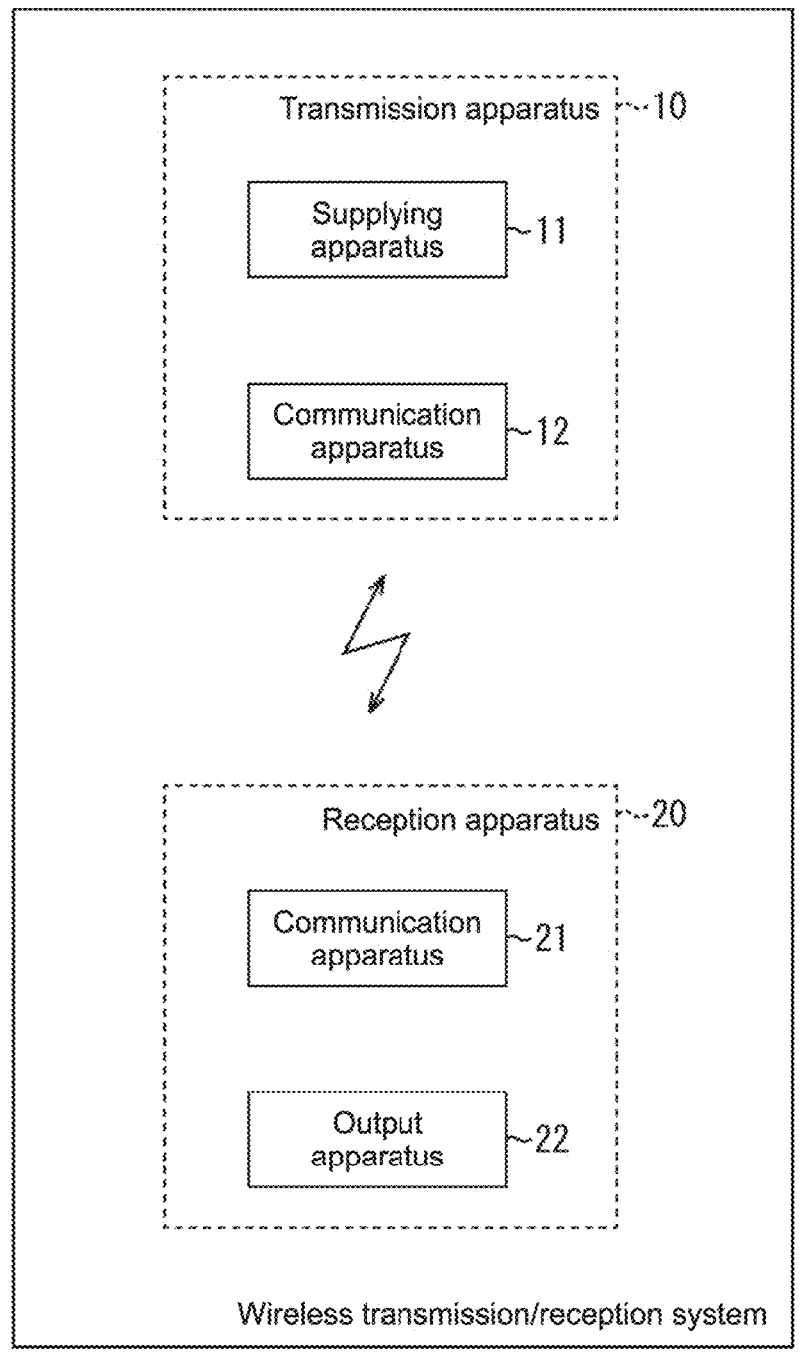
FIG. 1 A block diagram showing a configuration example of an embodiment of a wireless transmission/reception system to which a data processing apparatus of the present technology is applied.

FIG. 1 is a block diagram showing a configuration example of an embodiment of a wireless transmission/reception system to which a data processing apparatus of the present technology is applied.

In FIG. 1, a wireless transmission/reception system includes a transmission apparatus 10 and a reception apparatus 20.

The transmission apparatus 10 includes a supplying apparatus 11 and a communication apparatus 12.

The supplying apparatus 11 supplies the communication apparatus 12 with data to be wirelessly transmitted, e.g., acoustic data. As the supplying apparatus 11, for example, a portable device (e.g., a mobile phone, a smartphone, a portable music player, etc.) that reproduces acoustic data, or a stationary device (e.g., a stationary music player, a PC (Personal Computer), etc.) can be employed.

The communication apparatus 12 wirelessly communicates with a communication apparatus 21, and wirelessly transmits, to the communication apparatus 21, acoustic data or the like supplied from the supplying apparatus 11.

Note that the supplying apparatus 11 and the communication apparatus 12 may be configured as one apparatus (transmission apparatus 10) housed in one enclosure, or separated apparatuses housed in separated enclosures.

The reception apparatus 20 includes the communication apparatus 21 and an output apparatus 22.

The communication apparatus 21 wirelessly communicates with the communication apparatus 12, receives acoustic data or the like wirelessly transmitted from the communication apparatus 12, and supplies it to the output apparatus 22.

The output apparatus 22 outputs sound corresponding to the acoustic data supplied from the communication apparatus 21. As the output apparatus 22, for example, a headphone (including an earphone) that converts acoustic data that is an electric signal into sound that can be audibly recognized, or a speaker (including an apparatus such as a TV (television receiver) that has a speaker and the like therein) can be employed.

Note that the communication apparatus 21 and the output apparatus 22 may be configured as one apparatus (reception apparatus 20) housed in one enclosure, or separated apparatuses housed in separated enclosures.

In the wireless transmission/reception system configured as described above, the supplying apparatus 11 supplies acoustic data to the communication apparatus 12, in the transmission apparatus 10. The communication apparatus 12 wirelessly transmits the acoustic data from the supplying apparatus 11 to the communication apparatus 21.

In the reception apparatus 20, the communication apparatus 21 receives the acoustic data wirelessly transmitted from the communication apparatus 12, and supplies it to the output apparatus 22. The output apparatus 22 outputs sound corresponding to the acoustic data from the communication apparatus 21.

Hereinafter, as wireless communication between the communication apparatuses 12 and 21, details of the communication apparatuses 12 and 21 will be described with an example of the case where, for example, Bluetooth (registered trademark) is used to transmit/receive acoustic data.

<First Configuration Example of Communication Apparatuses 12 and 21>

Figure 2:
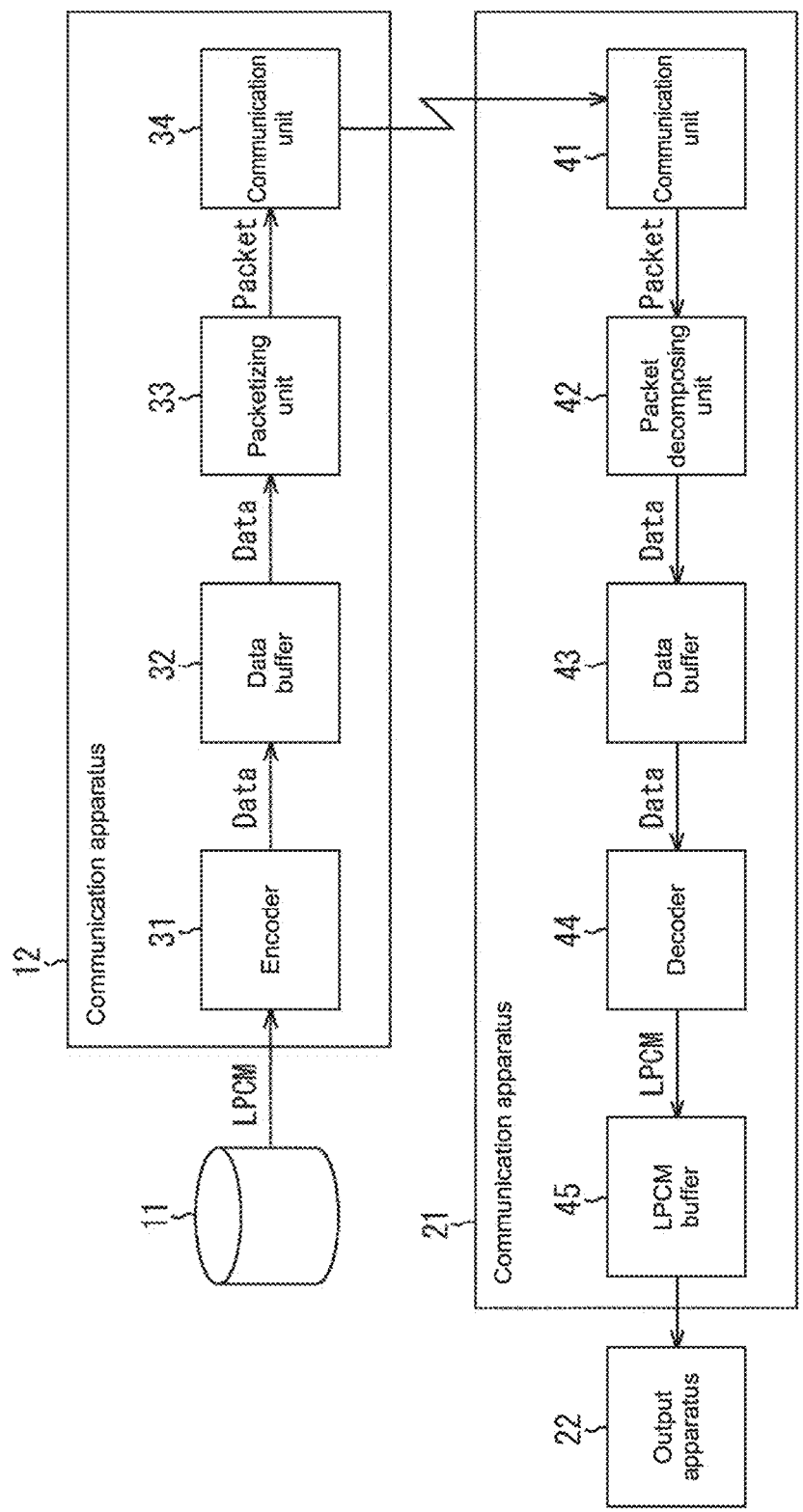
FIG. 2 A block diagram showing a first configuration example of communication apparatuses 12 and 21.

FIG. 2 is a block diagram showing a first configuration example of the communication apparatuses 12 and 21 in FIG. 1.

In FIG. 2, the communication apparatuses 12 and 21 transmit/receive acoustic data with, for example, Bluetooth (registered trademark). Now, assumption is made that the communication apparatus 12 and the communication apparatus 21 are respectively on the transmission side and the reception side, and acoustic data is transmitted from the communication apparatus 12 to the communication apparatus 21. In the case of Bluetooth (registered trademark), the communication apparatus 12 of the transmission side is referred to as a source and the communication apparatus 21 of the reception side is referred to as a sink.

In Bluetooth (registered trademark), an A2DP (Advanced Audio Distribution Profile) is specified as a profile for transmitting/receiving acoustic data.

In the A2DP, an essential codec (Mandatory Codec) called an SBC (Subband Codec) is defined. In the SBC, LPCM (Linear Pulse Code Modulation) data that is acoustic data is compressed, and is transmitted from the communication apparatus 12 of the transmission side to the communication apparatus 21 of the reception side.

In FIG. 2, the communication apparatus 12 includes an encoder 31, a data buffer 32, a packetizing unit 33, and a communication unit 34.

To the encoder 31, LPCM data that is acoustic data is supplied from the supplying apparatus 11.

The encoder 31 is, for example, an SBC encoder, and performs encoding in which LPCM data from the supplying apparatus 11 is compressed to the amount corresponding to not more than ¼ of the original data amount in units called frames such as 64 samples and 128 samples.

The encoder 31 supplies the encoded data (Encoded Bit-stream) acquired from the encoding results to the data buffer 32.

The data buffer 32 temporarily stores the encoded data supplied from the encoder 31.

The encoded data stored in the data buffer 32 is appropriately read and supplied to the packetizing unit 33.

The packetizing unit 33 packetizes the encoded data from the data buffer 32 into packets, and supplies them to the communication unit 34. Note that the packetizing unit 33 generates packets of a size for, for example, reducing the power consumption in, for example, packet transmission in the communication unit 34 in the subsequent stage.

The communication unit 34 modulates the packet from the packetizing unit 33 into an RF (Radio Frequency) signal, and wirelessly transmits it.

The communication apparatus 21 includes a communication unit 41, a packet decomposing unit 42, a data buffer 43, a decoder 44, and an LPCM buffer 45.

The communication unit 41 receives the RF signal from the communication unit 34, demodulates the baseband packet, and supplies it to the packet decomposing unit 42.

The packet decomposing unit 42 decomposes the packet from the communication unit 41, and supplies the resulting encoded data to the data buffer 43.

The data buffer 43 temporarily stores the encoded data supplied from the packet decomposing unit 42.

The encoded data stored in the data buffer 43 is appropriately read, and supplied to the decoder 44.

The decoder 44 is, for example, an SBC decoder, decodes the encoded data from the data buffer 43 to LPCM data, and supplies it to the LPCM buffer 45.

The LPCM buffer 45 temporarily stores the LPCM data supplied from the decoder 44.

The LPCM data stored in the LPCM buffer 45 is read at a rate necessary for real-time reproduction, and supplied to the output apparatus 22.

The output apparatus 22 outputs sound corresponding to the LPCM data from the LPCM buffer 45.

The above-mentioned wireless transmission/reception of data between the communication apparatuses 12 and 21 does not necessarily succeed due to the state (radio wave state) of a transmission path between the communication apparatuses 12 and 21, and the like.

In the case where the wireless transmission/reception of data between the communication apparatuses 12 and 21 has failed, the communication apparatus 12 performs retransmission in which data is transmitted again to the communication apparatus 21.

For this retransmission, the communication apparatus 12 of the transmission side includes the data buffer 32, and the communication apparatus 21 of the reception side includes the data buffer 43.

Specifically, in the case where the transmission/reception of data has failed, data is temporarily stored in the data buffer 32 to transmit the data that has failed to be transmitted/received again in the communication apparatus 12 of the transmission side. Note that the data that has failed to be transmitted/received is not actually stored in the data buffer 32, considering the processing efficiency. The data packetized in the packetizing unit 33 is held in the communication unit 34, and the held data is used to perform transmission again. Note that when this is attempted to be specifically illustrated, description of a synchronized operation of the data buffer 32 and a data buffer 43 below is made very difficult. Therefore, description is simplified by assuming that data is all stored in the data buffer 32 and the exchange with the data buffer 32 is performed for each time of transmission/reception although the efficiency is not good. There is no problem because both of them can be performed in view of the possibility.

Further, in the case where transmission/reception of data has failed, in the communication apparatus 21 of the reception side, data is temporarily stored in the data buffer 43 in order to prevent sound break from occurring due to interruption of output of data (acoustic data) to the output apparatus 22 as a result of no encoded data to be decoded in the decoder 44.

The storage amount of (data stored in) the data buffer 32 or 43 is changed by, for example, retransmission of data.

Figure 3:
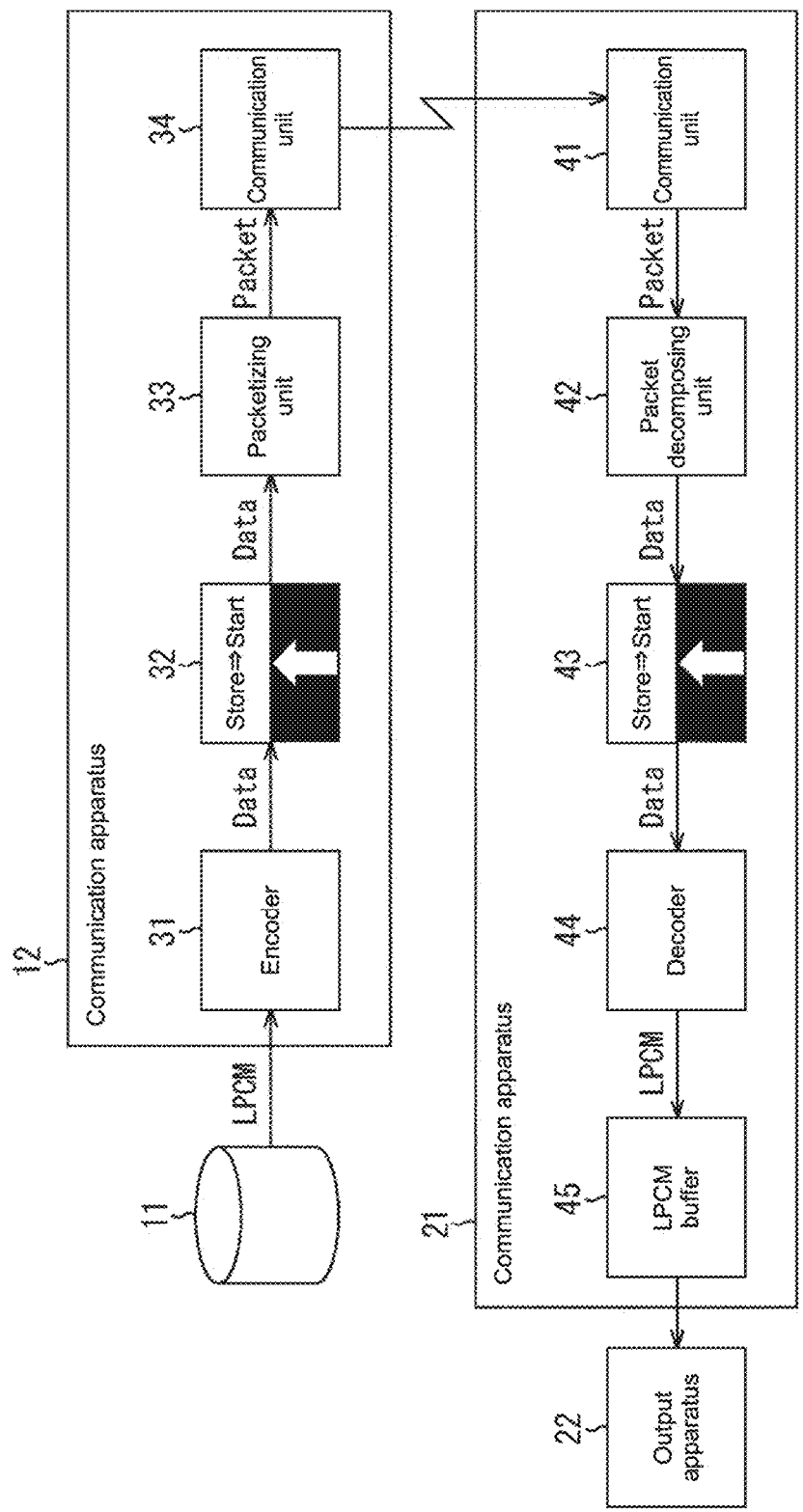
FIG. 3 A diagram showing an example of the change in the storage amount of data buffers 32 and 43.

FIG. 3 is a diagram showing an example of the change in the storage amount of the data buffers 32 and 43.

Specifically, FIG. 3 is a diagram showing an example of the change in the storage amount of the data buffers 32 and 43 at the time when data transmission from the communication apparatus 12 to the communication apparatus 21 is started.

In the communication apparatus 12, when the storage amount of the data buffer 32 reaches a predetermined data amount, i.e., encoded data from the encoder 31 is stored in the data buffer 32 by the predetermined data amount, reading and transmission of encoded data from the data buffer 32 are started.

Similarly, also in the communication apparatus 21, when the storage amount of the data buffer 43 reaches a predetermined data amount (that does not necessarily correspond to the storage amount of the data buffer 32 at the time when transmission of encoded data is started in the communication apparatus 12), i.e., encoded data from the packet decomposing unit 42 is stored in the data buffer 43 by the predetermined amount, reading (reproduction) of encoded data from the data buffer 43 is started.

Figure 4:
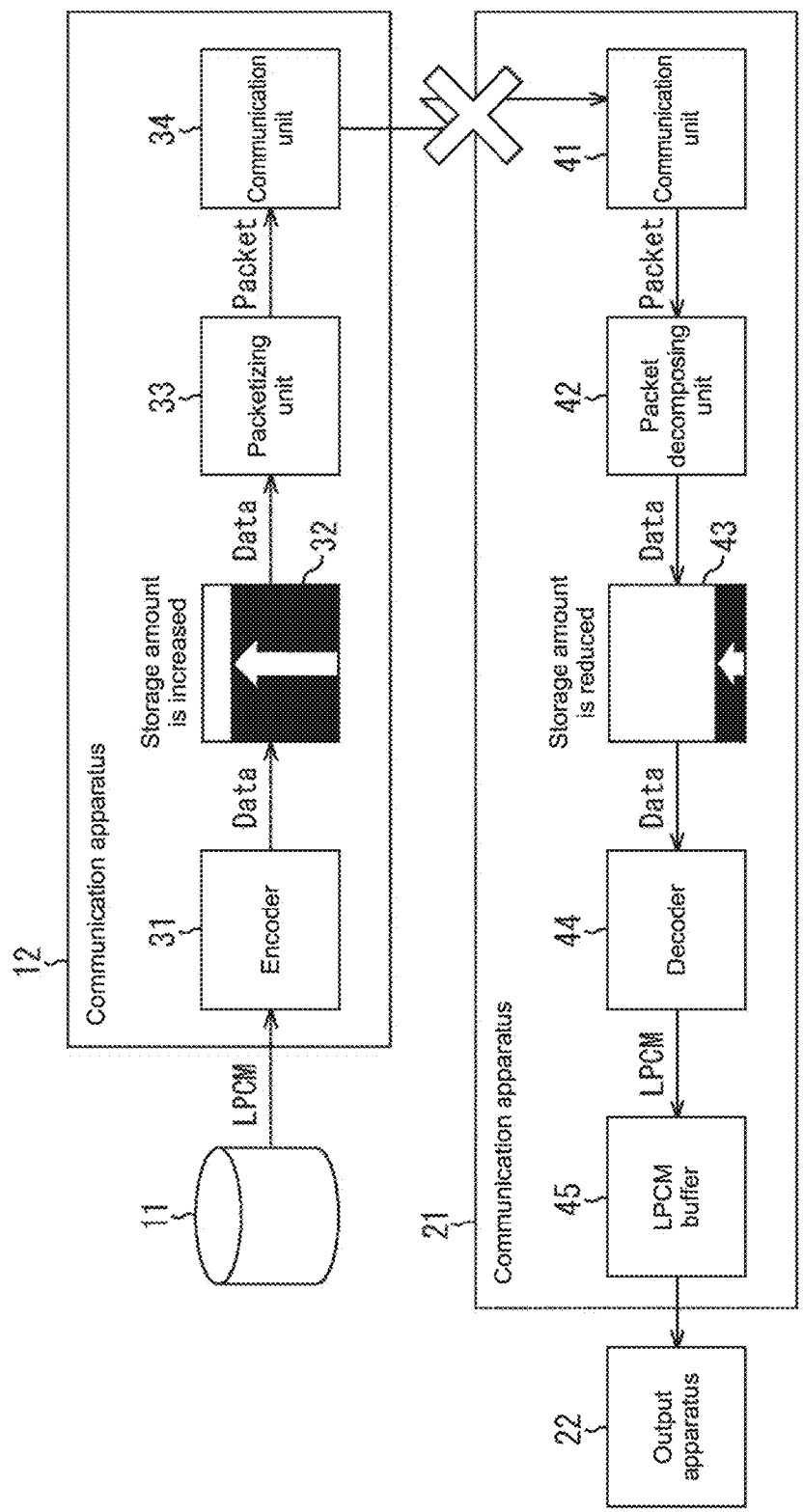
FIG. 4 A diagram showing an example of the change in the storage amount of the data buffers 32 and 43 at the time when data transmission from the communication apparatus 12 to the communication apparatus 21 is temporarily stopped.

FIG. 4 is a diagram showing an example of the change in the storage amount of the data buffers 32 and 43 at the time when data transmission from the communication apparatus 12 to the communication apparatus 21 is temporarily stopped due to deterioration of the state of the transmission path, and the like.

When the data transmission from the communication apparatus 12 to the communication apparatus 21 is temporarily stopped (data transmission/reception has failed), in the communication apparatus 12, the encoded data that is stored in the data buffer 32 and has not been transmitted is held while being stored in in the data buffer 32 and encoded data continues to be supplied from the encoder 31 to the data buffer 32. Therefore, the storage amount of the data buffer 32 is increased.

Further, in the communication apparatus 21, encoded data continues to be supplied from the data buffer 43 to the decoder 44, and supplying of encoded data from the packet decomposing unit 42 to the data buffer 43 is stopped. Therefore, the storage amount of the data buffer 43 is decreased.

Therefore, when data transmission/reception from the communication apparatus 12 to the communication apparatus 21 continues to fail, the data buffer 32 overflows and the data buffer 43 underflows.

Then, in the case where the data buffer 32 overflows or the data buffer 43 underflows, data to be output to the output apparatus 22 is finally deficient, and sound break occurs.

Figure 5:
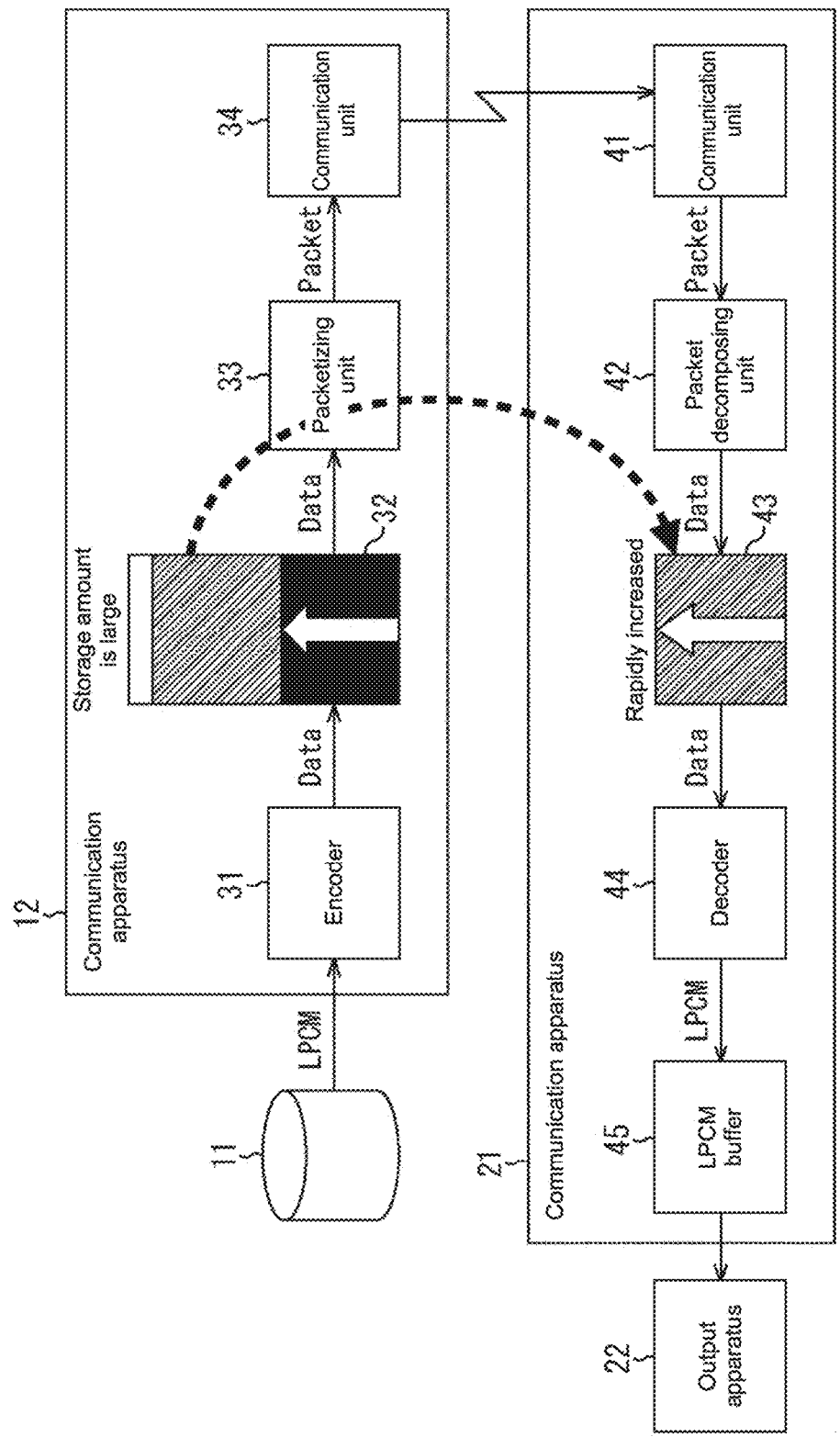
FIG. 5 A diagram showing an example of the change in the storage amount of the data buffers 32 and 43 at the time when the condition of a transmission path is restored and the data transmission is resumed.

FIG. 5 is a diagram showing an example of the change in the storage amount of the data buffers 32 and 43 at the time when the condition of a transmission path is restored and the data transmission is resumed after data transmission from the communication apparatus 12 to the communication apparatus 21 is temporarily stopped.

As described in FIG. 4, when the data transmission from the communication apparatus 12 to the communication apparatus 21 is temporarily stopped, the storage amount of the data buffer 32 is increased.

In the case where the storage amount of the data buffer 32 is significantly increased and a large amount of encoded data is stored in the data buffer 32, when the condition of a transmission path is restored and the data transmission is resumed, encoded data stored in the data buffer 32 is successively transmitted from the communication apparatus 12 to the communication apparatus 21 to reduce the storage amount of the data buffer 32.

As described above, in the case where the encoded data stored in the data buffer 32 continues to be successively transmitted from the communication apparatus 12 to the communication apparatus 21, the storage amount of the data buffer 43 in the communication apparatus 21 is rapidly increased and the data buffer 43 overflows in some cases.

In the communication apparatus 21, in the case where the data buffer 43 is likely to overflow, it is possible to stop transmission of data from the communication apparatus 12 to the communication apparatus 21 by transmitting a signal for stopping transmission (rejecting reception) from the communication unit 41 to the communication unit 34.

However, when data transmission from the communication apparatus 12 to the communication apparatus 21 is stopped right after transmission of encoded data stored in the data buffer 32 is started to reduce the significantly increased storage amount of the data buffer 32, the storage amount of the data buffer 32 is increased again, the data buffer 32 overflows, and sound break occurs in some cases.

<Second Configuration Example of Communication Apparatuses 12 and 21>

Figure 6:
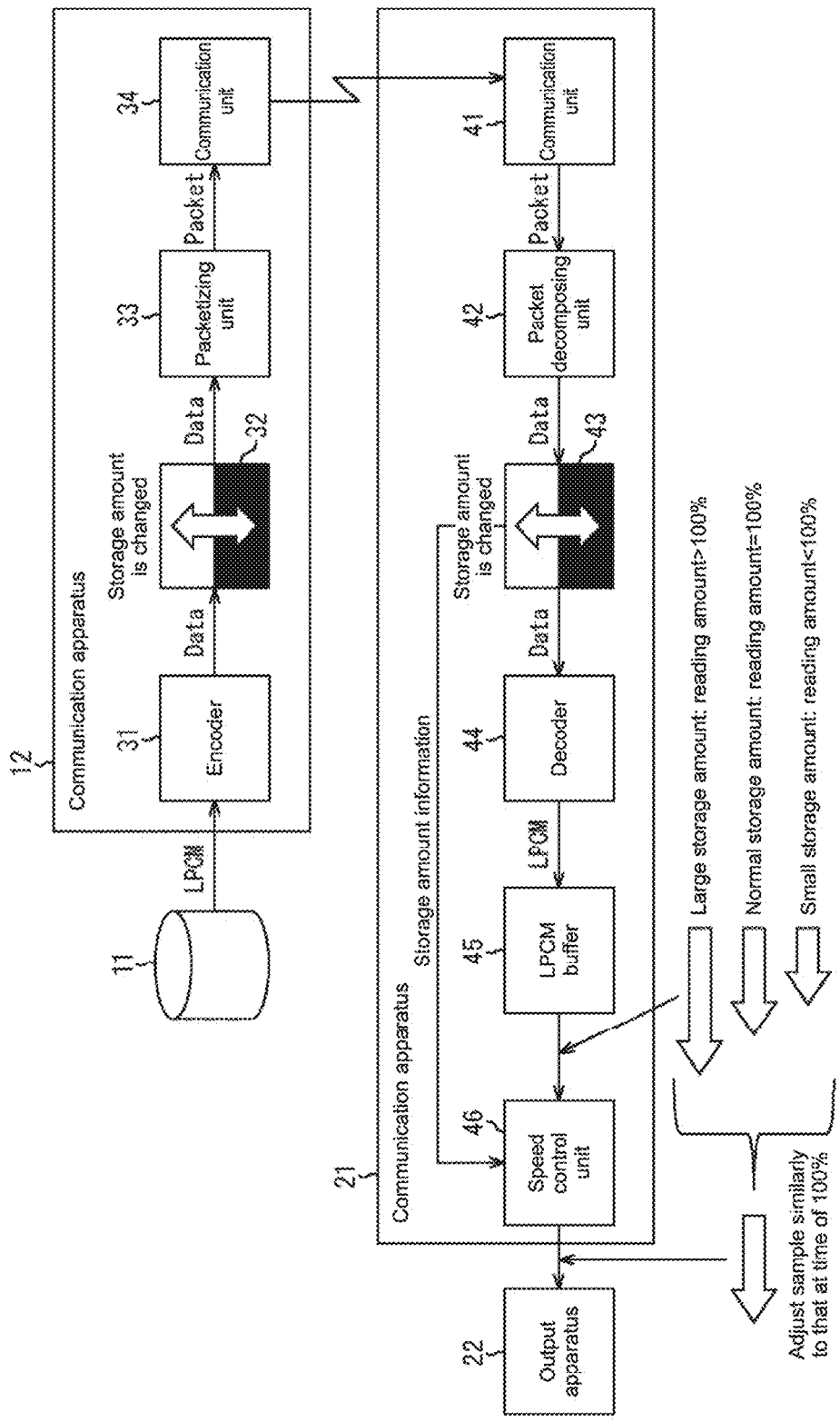
FIG. 6 A block diagram showing a second configuration example of the communication apparatuses 12 and 21.

In this regard, FIG. 6 is a block diagram showing a second configuration example of the communication apparatuses 12 and 21 in FIG. 1.

Note that in the figure, components corresponding to those in FIG. 2 will be denoted by the same reference numerals and description thereof will be appropriately omitted hereinafter.

In FIG. 6, the communication apparatus 12 includes the encoder 31 to the communication unit 34, and is configured similarly to that in FIG. 2.

Further, in FIG. 6, the communication apparatus 21 is common to that in FIG. 2 in that the communication apparatus 21 includes the communication unit 41 to the LPCM buffer 45.

However, in FIG. 6, the communication apparatus 21 is different from that in FIG. 2 in that the communication apparatus 21 further includes a speed control unit 46.

In FIG. 2, the LPCM data stored in the LPCM buffer 45 is read at a rate necessary for real-time reproduction (hereinafter, referred to also as standard rate), and is supplied to the output apparatus 22.

On the other hand, in FIG. 6, the speed control unit 46 changes the rate for reading LPCM data from the LPCM buffer 45 from the standard rate depending on the storage amount of the data buffer 43.

Specifically, in the case where the storage amount of the data buffer 43 is small and the data buffer 43 is likely to underflow, the speed control unit 46 makes the rate for reading LPCM data from the LPCM buffer 45 slower than the standard rate, extends the LPCM data in the time direction, and supplies it to the output apparatus 22.

In the case where the rate for reading the LPCM data from the LPCM buffer 45 is slow, the rate (data amount read per time unit) of encoded data read from the data buffer 43 to the decoder 44 is also slow. As a result, the storage amount of the data buffer 43 is gradually increased.

On the other hand, in the case where the storage amount of the data buffer 43 is large and the data buffer 43 is likely to overflow, the speed control unit 46 makes the rate for reading LPCM data from the LPCM buffer 45 higher than the standard rate, shortens the LPCM data in the time direction, and supplies it to the output apparatus 22.

In the case where the rate for reading LPCM data from the LPCM buffer 45 is high, the rate of encoded data read from the data buffer 43 to the decoder 44 is also high. As a result, the storage amount of the data buffer 43 is gradually reduced.

As described above, the storage amount of the data buffer 43 in the communication apparatus 21 of the reception side is increased and decreased to reach an appropriate storage amount. Accordingly, secondarily, the storage amount of the data buffer 32 in the communication apparatus 12 of the transmission side also reaches an appropriate storage amount.

With the communication apparatuses 12 and 21 in FIG. 6, it is possible to reduce the frequency of sound break due to an overflow or underflow of the data buffers 32 and 43 as compared with the case of FIG. 2.

Note that because the LPCM data is extended or shortened in the time direction in the communication apparatuses 12 and 21 in FIG. 6, the reproduction time of the LPCM data is changed (reproduction speed is changed from the speed for real-time reproduction).

Since the reproduction time of the LPCM data is changed, the pitch of sound output from the output apparatus 22 is changed. Such a change in the pitch causes a feeling of strangeness of a user in terms of a sense of hearing as deterioration of sound quality.

In this regard, a technology for preventing sound break due to an overflow or underflow of the data buffers 32 and 43 from occurring without changing the pitch of sound will be described.

<Third Configuration Example of Communication Apparatuses 12 and 21>

Figure 7:
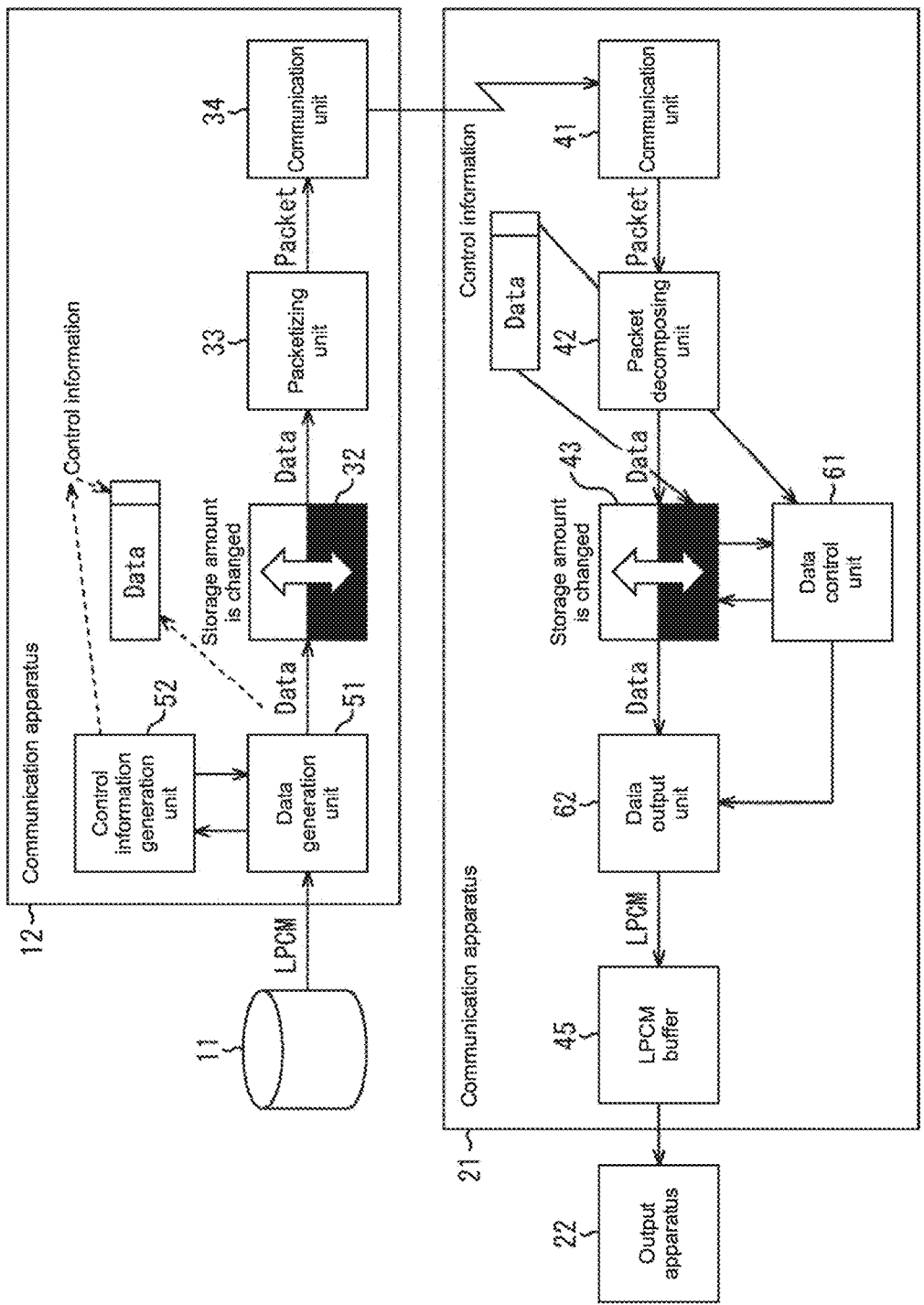
FIG. 7 A block diagram showing a third configuration example of the communication apparatuses 12 and 21.

FIG. 7 is a block diagram showing a third configuration example of the communication apparatuses 12 and 21 in FIG. 1.

Note that in the figure, components corresponding to those in FIG. 2 will be denoted by the same reference numerals and description thereof will be appropriately omitted hereinafter.

In FIG. 7, the communication apparatus 12 is common to that in FIG. 2 in that the communication apparatus 12 includes the data buffer 32 to the communication unit 34.

Note that in FIG. 7, the communication apparatus 12 is different from that in FIG. 2 in that the communication apparatus 12 includes a data generation unit 51 instead of the encoder 31 and further includes control information generation unit 52.

Further, in FIG. 7, the communication apparatus 21 is common to that in FIG. 2 in that the communication apparatus 21 includes the communication unit 41 to the data buffer 43, and the LPCM buffer 45.

Note that in FIG. 7, the communication apparatus 21 is different from that in FIG. 2 in that the communication apparatus 21 further includes a data control unit 61, and includes a data output unit 62 instead of the decoder 44.

In the communication apparatuses 12 and 21 in FIG. 7, the communication apparatus 12 generates control information for controlling a method of using data in the communication apparatus 21 of the reception side, and the communication apparatus 21 controls the method of using data stored in the data buffer 43 on the basis of the control information. Accordingly, sound break due to an overflow or underflow of the data buffers 32 and 43 is prevented from occurring without changing the pitch of sound, as in the case of FIG. 6.

LPCM data that is acoustic data is supplied from the supplying apparatus 11 to the data generation unit 51, and is supplied also to the control information generation unit 52. The control information generation unit 52 performs necessary processing on the LPCM data, and supplies control information.

The data generation unit 51 generates data-with-control-information by performing necessary processing on the LPCM data from the supplying apparatus 11 and adding the control information from the control information generation unit 52.

Specifically, the data generation unit 51 divides the LPCM data from the supplying apparatus 11, for example, into frames such as 64 samples and 128 samples, and performs the SBC encoding similar to that performed by the SBC encoder 31 (FIG. 2) to generate encoded data.

Further, the data generation unit 51 generates data-with-control-information by adding control information corresponding to encoded data to the encoded data, supplies it to the data buffer 32, and causes the data buffer 32 to store it.

The control information generation unit 52 generates control information for controlling a method of using data for the frame of LPCM data corresponding to encoded data in the communication apparatus 21 of the reception side, and supplies it to the data generation unit 51.

Specifically, in the case where insertion or discard of the frame of LPCM data is performed in the communication apparatus 21 of the reception side, the control information generation unit 52 acquires a detection characteristic amount that represents the degree that the insertion or discard of the frame is detected. The detection characteristic amount may be one that represents the easiness of detection of insertion or discard of the frame or hardness of detection of insertion or discard of the frame.

Then, the control information generation unit 52 generates control information for the frame of LPCM data on the basis of the detection characteristic amount of the frame.

The detection characteristic amount can be generated from, for example, the results (e.g., frequency component) of processing performed on the frame of LPCM data acquired when the SBC encoding is performed in the data generation unit 51.

Further, the detection characteristic amount can be generated by performing processing on the frame of LPCM data acquired by the data generation unit 51 in the control information generation unit 52, for example.

As the detection characteristic amount, the physical amount that represents the tonality of LPCM data or gain (amplitude) of LPCM data can be employed.

As the physical amount that represents a tonality, for example, the distribution or correlation of the frequency component of LPCM data, the maximum value and minimum value of the frequency component of LPCM data, or the difference between the value of the frequency component of LPCM data and the average value thereof (hereinafter, referred to also as frequency component difference) can be employed.

Note that in the case where the gain or tonality of LPCM data is small, the insertion or discard of the LPCM data is hard to be detected.

Specifically, in the case where the frame of LPCM data with a small gain or tonality is inserted right after the frame or discarded, the insertion or discard is hard to be detected by a sense of hearing of a human.

Therefore, even when the frame of LPCM data with a small gain or tonality is inserted right after the frame or discarded, the sound quality when the user hears sound is substantially not affected. Note that in this embodiment, by performing not the insertion or discard of the frame of LPCM data but the insertion or discard of encoded data corresponding to the frame of LPCM data, the insertion or discard of the frame corresponding to the encoded data is substantially performed.

The control information generation unit 52 acquires the detection characteristic amount of the frame of LPCM data before generating control information of the encoded data corresponding to the frame of LPCM data on the basis of the magnitude relationship between the detection characteristic amount and a predetermined threshold value, for example.

Now, assumption is made that insertion or discard of encoded data corresponding to a frame of LPCM data is harder to be detected as the detection characteristic amount of the frame is smaller, for example. The control information generation unit 52 compares the detection characteristic amount of the frame of LPCM data with a predetermined threshold value, and generates control information indicating that insertion and discard of encoded data are accepted in the communication apparatus 21 of the reception side, for example, for encoded data with a detection characteristic amount smaller than (or not more than) a predetermined threshold value, i.e., encoded data whose insertion or discard is hard to be detected.

Further, the control information generation unit 52 generates, for example, control information indicating that the insertion and discard of encoded data are prohibited in the communication apparatus 21 of the reception side for encoded data (corresponding to a frame) with a detection characteristic amount not less than (or less than) a predetermined threshold value, i.e., encoded data whose insertion or discard is not hard to be detected.

Note that as the control information, information related to acceptance or prohibition of insertion or discard of encoded data can be widely employed.

Specifically, as the control information, for example, a flag of 1 bit (or more) indicating that insertion or discard of encoded data is accepted or prohibited can be employed.

Further, as the control information, for example, information that represents the level of acceptance or prohibition of insertion or discard of encoded data can be employed.

Note that as the information that represents the level of acceptance or prohibition of insertion or discard of encoded data, for example, four levels of a complete acceptance level indicating that insertion or discard of encoded data is accepted when it is necessary for preventing sound break from occurring, a quasi-acceptance level indicating that insertion or discard of encoded data is accepted in the case where the necessity of preventing sound break from occurring is high, a quasi-prohibition level indicating that insertion or discard of encoded data is accepted only in the case where it is absolutely necessary for preventing sound break from occurring, and a prohibition level indicating that insertion or discard of encoded data is prohibited in any case can be employed.

In the case where the four levels of the complete acceptance level, the quasi-acceptance level, the quasi-prohibition level, and the prohibition level are employed as the control information, the control information is information of two bits (or more).

In the case where the above-mentioned four levels are employed as the control information, the control information generation unit 52 generates, on the basis of the magnitude relationship between a detection characteristic amount X and three threshold values TH1, TH2, and TH3 (TH1<TH2<TH3), for example, control information that represents the complete acceptance level when X<TH1 and generates control information that represents the quasi-acceptance level when TH1<X<TH2. Further, the control information that represents the quasi-prohibition level is generated when TH2<X<TH3, and control information that represents the prohibition level is generated when TH3<X.

Note that as the control information, information related to insertion of encoded data and information related to discard of encoded data can be separately generated instead of information related to insertion and discard of encoded data.

In this case, the control information as information related to insertion of encoded data can be generated on the basis of the characteristic amount that represents the degree that insertion of encoded data when the encoded data is inserted right after the encoded data is detected. Similarly, the control information as information related to discard of encoded data can be generated on the basis of the characteristic amount that represents the degree that discard of encoded data when the encoded data is discarded is detected.

Further, although a physical amount in which insertion or discard of encoded data is harder to be detected as the value is smaller is employed as the detection characteristic amount in the above-mentioned case, a physical amount in which insertion or discard of encoded data is harder to be detected as the value is larger can be employed as the detection characteristic amount.

Hereinafter, a flag of one bit that represents acceptance or prohibition of insertion and discard of encoded data is employed as the control information, and a physical amount (e.g., tonality) in which insertion and discard of encoded data are harder to be detected as the value is smaller is employed as the detection characteristic amount, in order to make the description easy.

Note that insertion or discard of encoded data is included in the method of using encoded data. Therefore, the control information that represents acceptance or prohibition of insertion or discard of encoded data can be said to be information for controlling a method of using encoded data in the communication apparatus 21 of the reception side.

Further, because encoded data is used a plurality of times or not used in accordance with insertion or discard of the encoded data, the control information can be said to be information for controlling the number of use of the encoded data in the communication apparatus 21 of the reception side.

In FIG. 7, the data control unit 61 controls the method of using data on the basis of the control information included in the data-with-control-information stored in the data buffer 43.

Note that in the communication apparatus 12 in FIG. 7, data-with-control-information is generated, stored in the data buffer 32, and transmitted to the communication apparatus 21 via the packetizing unit 33 and the communication unit 34 in the data generation unit 51.

Then, in the communication apparatus 21, data-with-control-information from the communication apparatus 12 is supplied to the data buffer 43 via the communication unit 41 and the packet decomposing unit 42. Therefore, in the data buffer 43, data-with-control-information is stored.

The data control unit 61 performs insertion or discard of encoded data included in data-with-control-information, for example, as control of the method of using the encoded data on the basis of the control information included in the data-with-control-information stored in the data buffer 43 as described above.

Note that in the data control unit 61, insertion of encoded data can be performed by copying the encoded data in the data buffer 43, for example.

The copying of the encoded data stored in the data buffer 43 can be performed by holding the encoded data stored in the data buffer 43 when the encoded data (included in data-with-control-information) is read from the data buffer 43. When the held encoded data stored in the data buffer 43 is referred to as a copy of encoded data, encoded data is inserted by reading the copy of encoded data from the data buffer 43.

Further, in the data control unit 61, discard of encoded data can be performed by skipping the reading of encoded data from the data buffer 43.

To the data output unit 62, the encoded data read from the data buffer 43, i.e., encoded data whose use method is controlled by the data control unit 61 on the basis of control information is supplied.

The data output unit 62 outputs the encoded data supplied from the data buffer 43 to the output apparatus 22 via the LPCM buffer 45.

Specifically, the data output unit 62 performs SBC decoding similar to that performed by the SBC decoder 44 on the encoded data from the data buffer 43, for example, and outputs the resulting LPCM data to the output apparatus 22 via the LPCM buffer 45.

Figure 8:
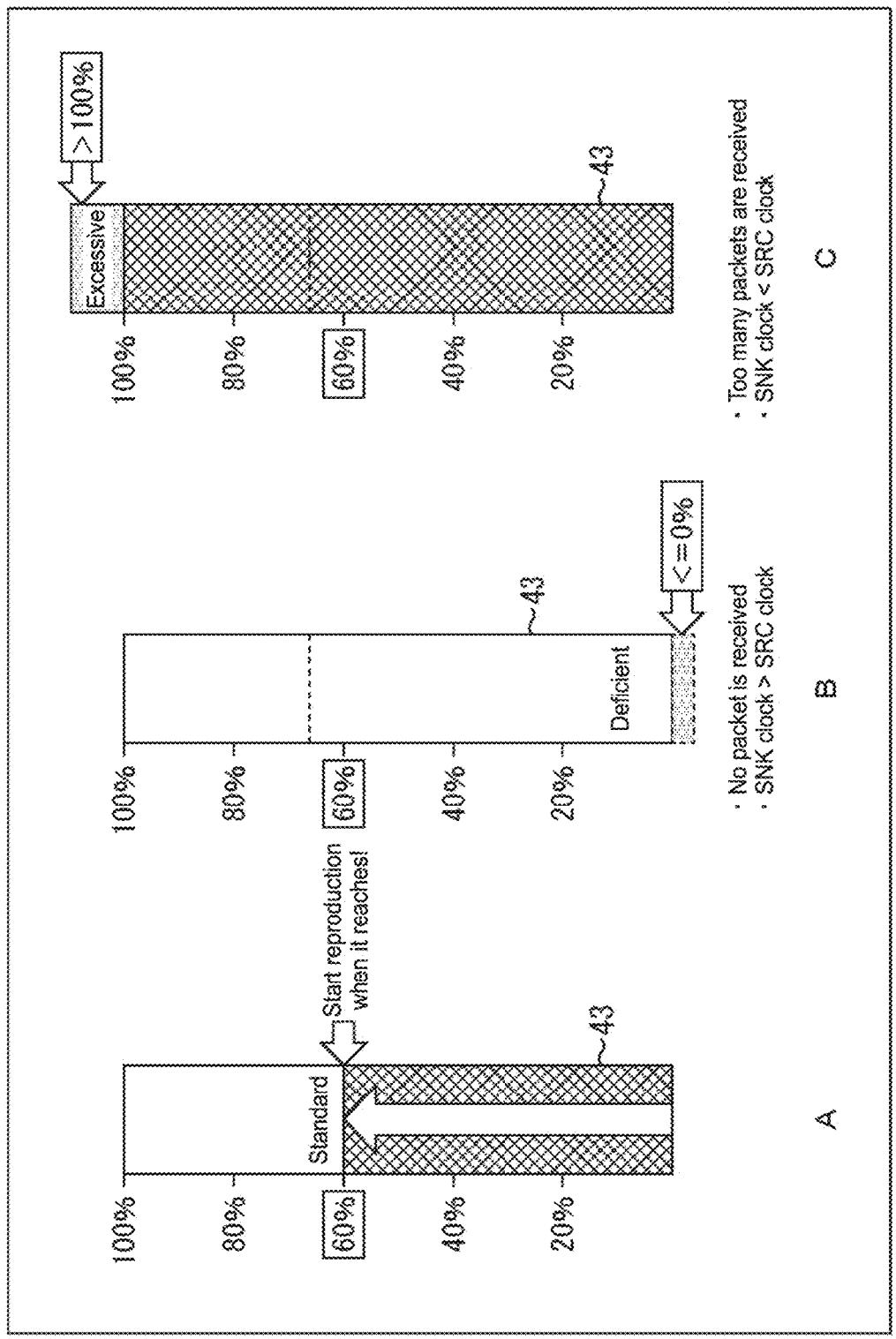
FIG. 8 A diagram showing an example of the change in the storage amount of the data buffer 43 in the communication apparatus 21.

FIG. 8 is a diagram showing an example of the change in the storage amount of the data buffer 43 in the communication apparatus 21 in FIG. 7.

In the data buffer 43, data-with-control-information is stored as follows.

Specifically, LPCM data is encoded in the data generation unit 51 in the communication apparatus 12 and control information is generated in the control information generation unit 52.

Further, in the communication apparatus 12, data-with-control-information is generated by adding the control information generated by the control information generation unit 52 to the encoded data acquired by encoding LPCM data in the data generation unit 51.

The data-with-control-information is supplied from the data generation unit 51 to the data buffer 32, and stored in the data buffer 32.

The data-with-control-information stored in the data buffer 32 is appropriately read, and supplied to the packetizing unit 33.

The data-with-control-information from the data buffer 32 is packetized into packets in the packetizing unit 33, and supplied to the communication unit 34. The packet from the packetizing unit 33 is modulated to an RF signal in the communication unit 34, and wirelessly transmitted.

The RF signal transmitted from the communication unit 34 is received by the communication unit 41 in the communication apparatus 21.

The RF signal is demodulated into packets in the communication unit 41, and supplied to the packet decomposing unit 42.

The packet from the communication unit 41 is decomposed in the packet decomposing unit 42, and the resulting data-with-control-information is supplied to the data buffer 43 and stored in the data buffer 43.

In this way, data-with-control-information is stored in the data buffer 43. When the storage amount of the data buffer 43 reaches a predetermined threshold value (or more), the data control unit 61 controls the data buffer 43 to start reading of the encoded data (included in data-with-control-information) from the data buffer 43.

Part A of FIG. 8 is a diagram showing the state of the data buffer 43 when reading of encoded data from the data buffer 43 is started.

In part A of FIG. 8, when the storage amount of the data buffer 43 is increased to 60% (or more) of the capacity (of the data buffer 43), reading of encoded data from the data buffer 43 is started.

In the case where transmission/reception of (RF signal of) the packet from the communication apparatus 12 to the communication apparatus 21 continues to fail or the clock (SNK (SINK) clock) of the communication apparatus 21 of the reception side continues to be higher than the clock (SRC (SOURCE) clock) of the communication apparatus 21 of the transmission side, for example, after reading of encoded data from the data buffer 43 is started, the storage amount of the data buffer 43 is reduced and the data buffer 43 underflows.

Part B of FIG. 8 is a diagram showing the state of the data buffer 43 that overflows.

In part B of FIG. 8, the storage amount of the data buffer 43 is 0% of the capacity and overflows.

As described above, when the data buffer 43 underflows, output of acoustic data (to the output apparatus 22 via the LPCM buffer 45) by the data output unit 62 is interrupted and sound break occurs.

Further, in the case where packets are successively transmitted from the communication apparatus 12 to the communication apparatus 21 at once or the clock of the communication apparatus 21 of the transmission side continues to be higher than the clock of the communication apparatus 21 of the reception side, for example, after reading of encoded data from the data buffer 43 is started, the storage amount of the data buffer 43 is increased and the data buffer 43 overflows.

Part C of FIG. 8 is a diagram showing the state of the data buffer 43 that overflows.

In part C of FIG. 8, the storage amount of the data buffer 43 is 100% of the capacity and overflows.

When the data buffer 43 overflows as described above, the data supplied from the packet decomposing unit 42 to the data buffer 43 during the overflow is not stored in the data buffer 43 or data that is not supplied to the data output unit 62 is overwritten by the data supplied from the packet decomposing unit 42 to the data buffer 43 during the overflow.

As a result, in the output of data by the data output unit 62, data stored in the data buffer 43 or output of the overwritten data is interrupted, and sound break occurs.

In this regard, in the case where the data buffer 43 is likely to underflow, the data control unit 61 performs insertion of encoded data whose insertion (and discard) is accepted, i.e., encoded data whose insertion is hard to be detected on the basis of the control information.

Further, in the case where the data buffer 43 is likely to underflow, the data control unit 61 performs discard of encoded data whose discard (and insertion) is accepted, i.e., encoded data whose discard is hard to be detected on the basis of the control information.

Assumption is made that a flag of one bit that represents acceptance or prohibition of insertion and discard of encoded data is employed as the control information as described above, 1 (○) represents acceptance of insertion and discard of encoded data, and 0 (×) represents prohibition of insertion and discard of encoded data. In the case where the data buffer 43 is likely to underflow or underflow, the data control unit 61 is capable of preventing the underflow and overflow from occurring by performing insertion and discard of encoded data to which control information of 1 is added.

Note that even when processing of inserting (a copy of) encoded data of a silent part or a part with an extremely small gain (level) in acoustic data right after the encoded data or discarding the encoded data is performed, the insertion or discard is hard to be detected.

In the communication apparatus 12, control information of 1 is generated by the control information generation unit 52 for such encoded data of a silent part or a part with an extremely small gain. Further, when the data buffer 43 is likely to underflow or overflow, insertion or discard of encoded data of a silent part or a part with an extremely small gain is performed in the data control unit 61 in the communication apparatus 21. As a result, it is possible to prevent the data buffer 43 from underflowing and overflowing while causing a user to feel substantially no deterioration of sound quality when the user hears sound.

Note that there is a silent part or a part with an extremely small gain as the acoustic data from which insertion or discard is hard to be detected, as described above. However, the occurrence frequency of a silent part or a part with an extremely small gain is low in acoustic data. Specifically, a silent part or a part with an extremely small gain occurs at a limited place, e.g., between pieces of music, for example.

Note that examples of the acoustic data from which insertion or discard is hard to be detected in some cases include acoustic data with a high randomness and a small tonality such as sound of waves, white noise, consonants in sound, and instrumental sound of a cymbal, maracas, and the like, i.e., acoustic data with a high temporal discontinuity, in addition to a silent part or a part with an extremely small gain.

By regarding the acoustic data as an insertion or discard target, it is possible to insert or discard acoustic data at some frequency while causing a user to feel substantially no deterioration of sound quality.

FIG. 9, FIG. 10, FIG. 11, and FIG. 12 are each a diagram showing an example of acoustic data from which insertion and discard are hard to be detected.

Figure 9:
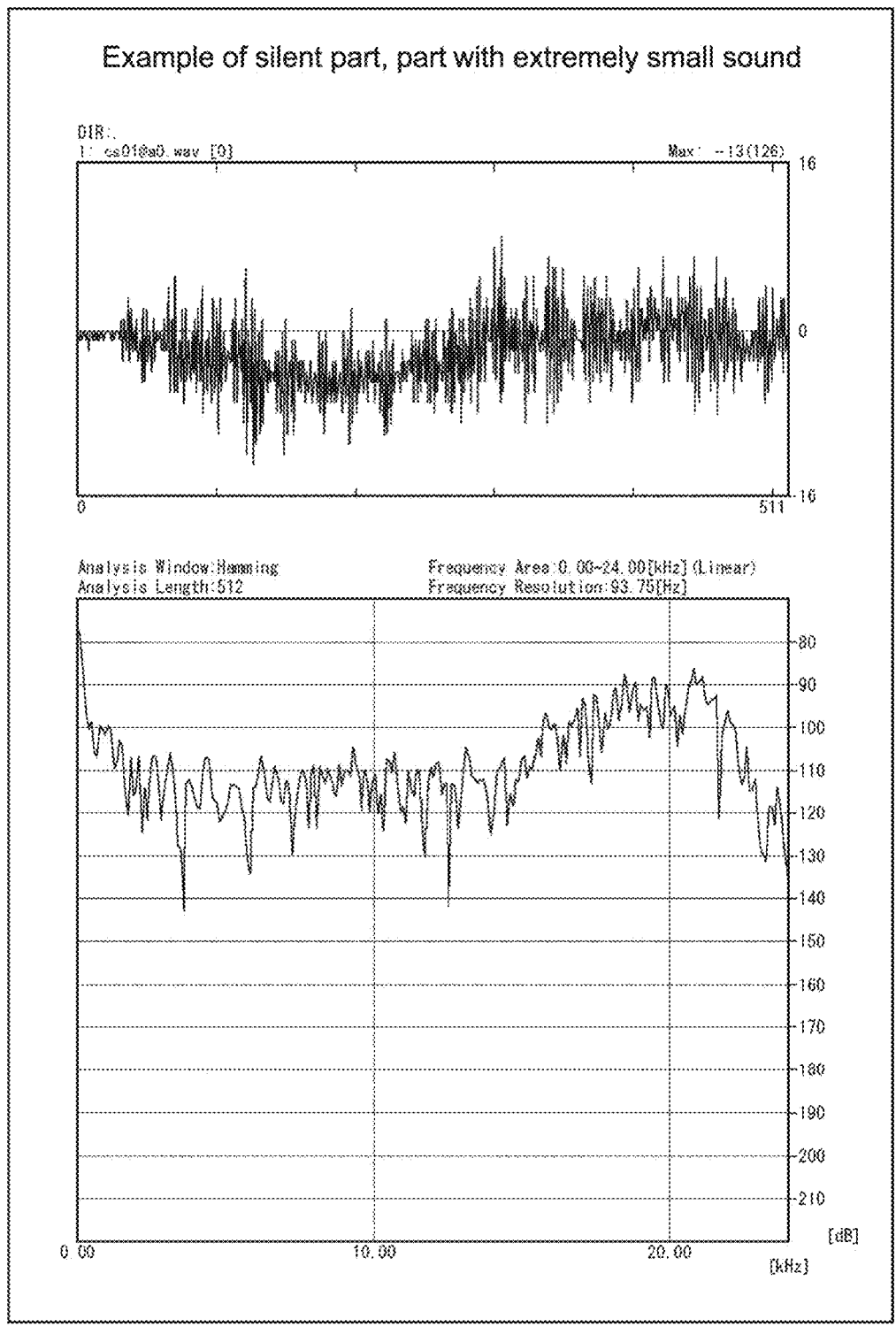
FIG. 9 A waveform diagram showing an example of acoustic data from which insertion and discard are hard to be detected.

Specifically, FIG. 9 shows examples of a time waveform (upper side) and frequency distribution (lower side) of acoustic data of silence and sound with an extremely small gain.

Figure 10:
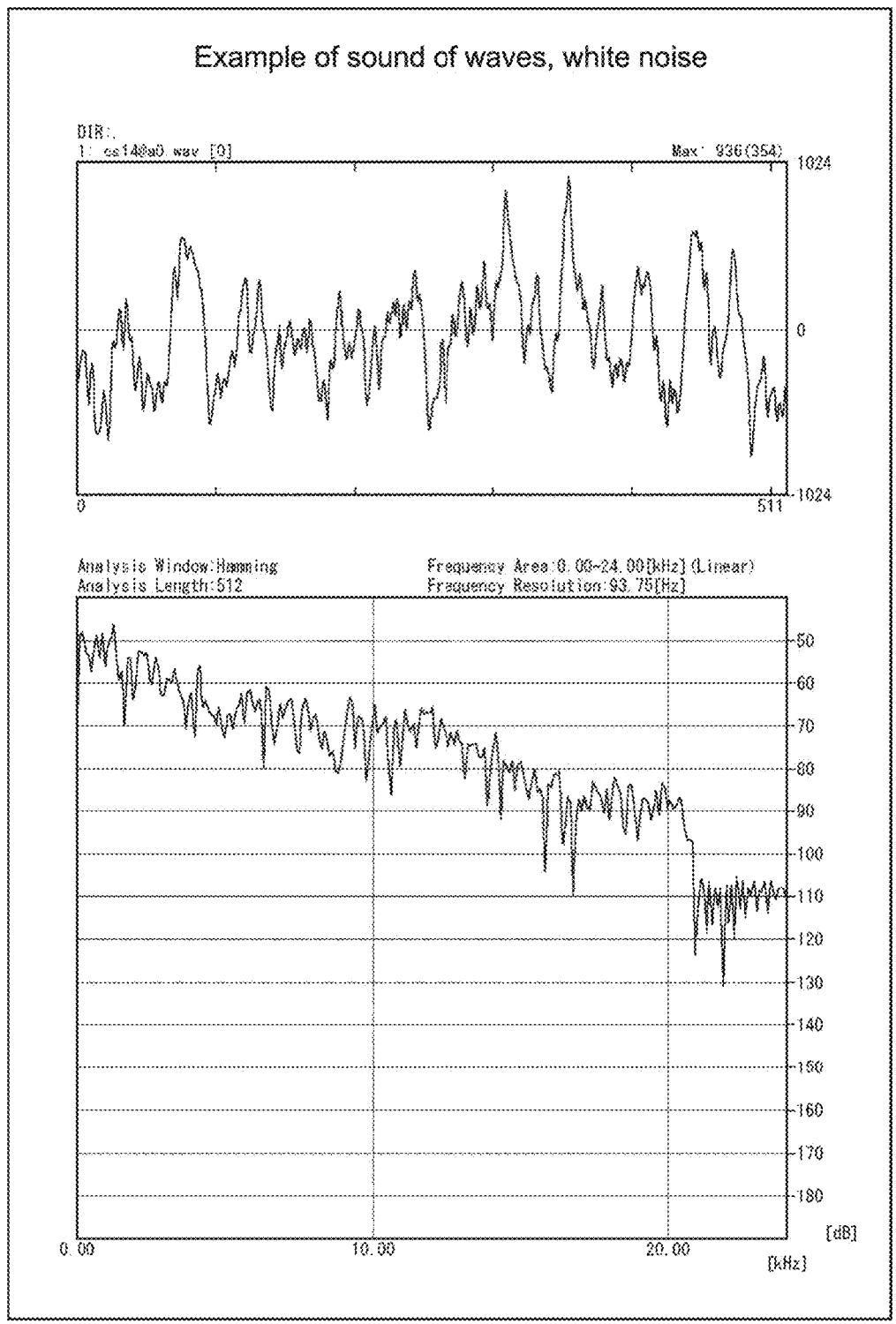
FIG. 10 A waveform diagram showing an example of acoustic data from which insertion and discard are hard to be detected.

FIG. 10 shows examples of a time waveform (upper side) and frequency distribution (lower side) of acoustic data of sound of waves and white noise.

Figure 11:
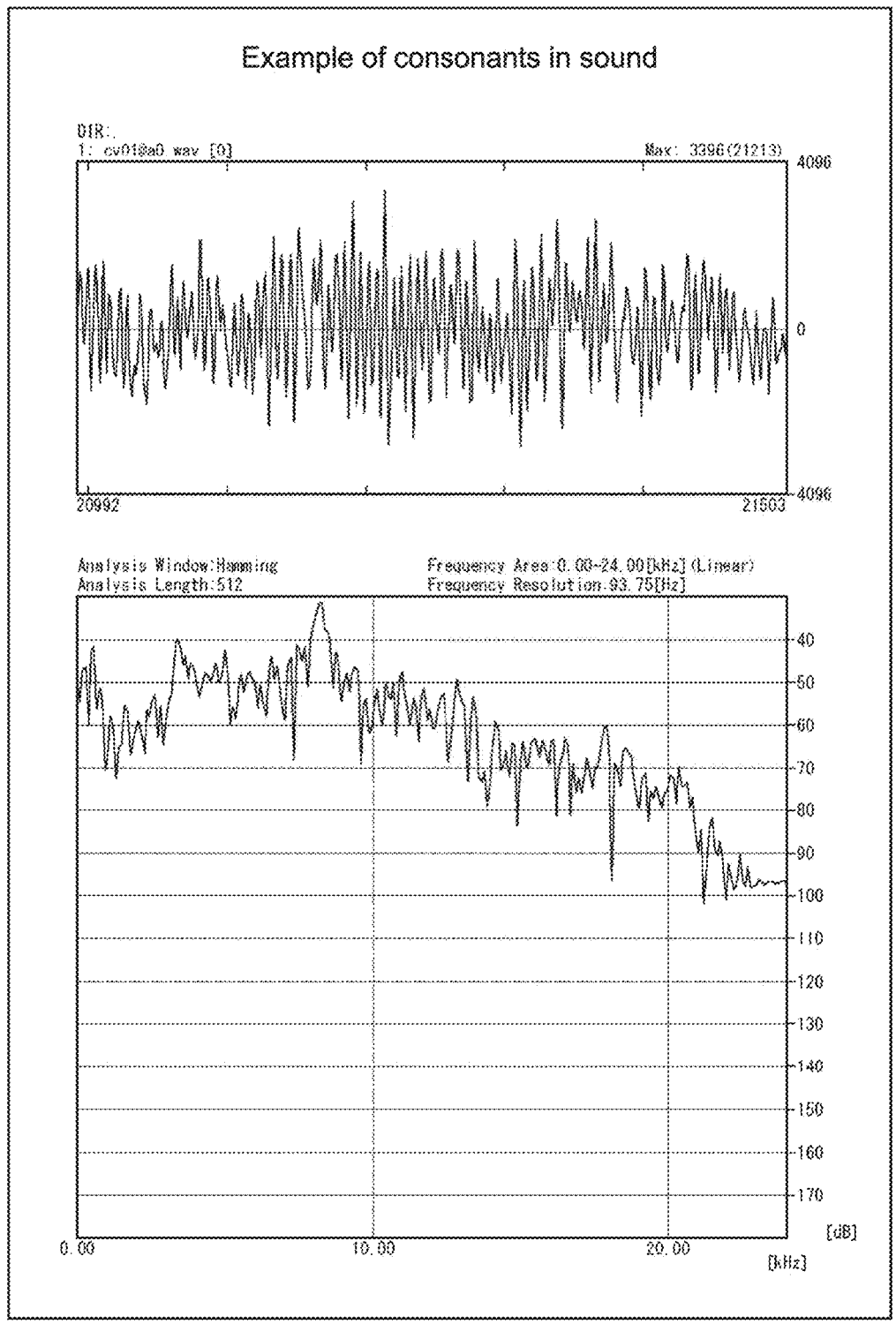
FIG. 11 A waveform diagram showing an example of acoustic data from which insertion and discard are hard to be detected.

FIG. 11 shows examples of a time waveform (upper side) and frequency distribution (lower side) of acoustic data of consonants in sound.

Figure 12:
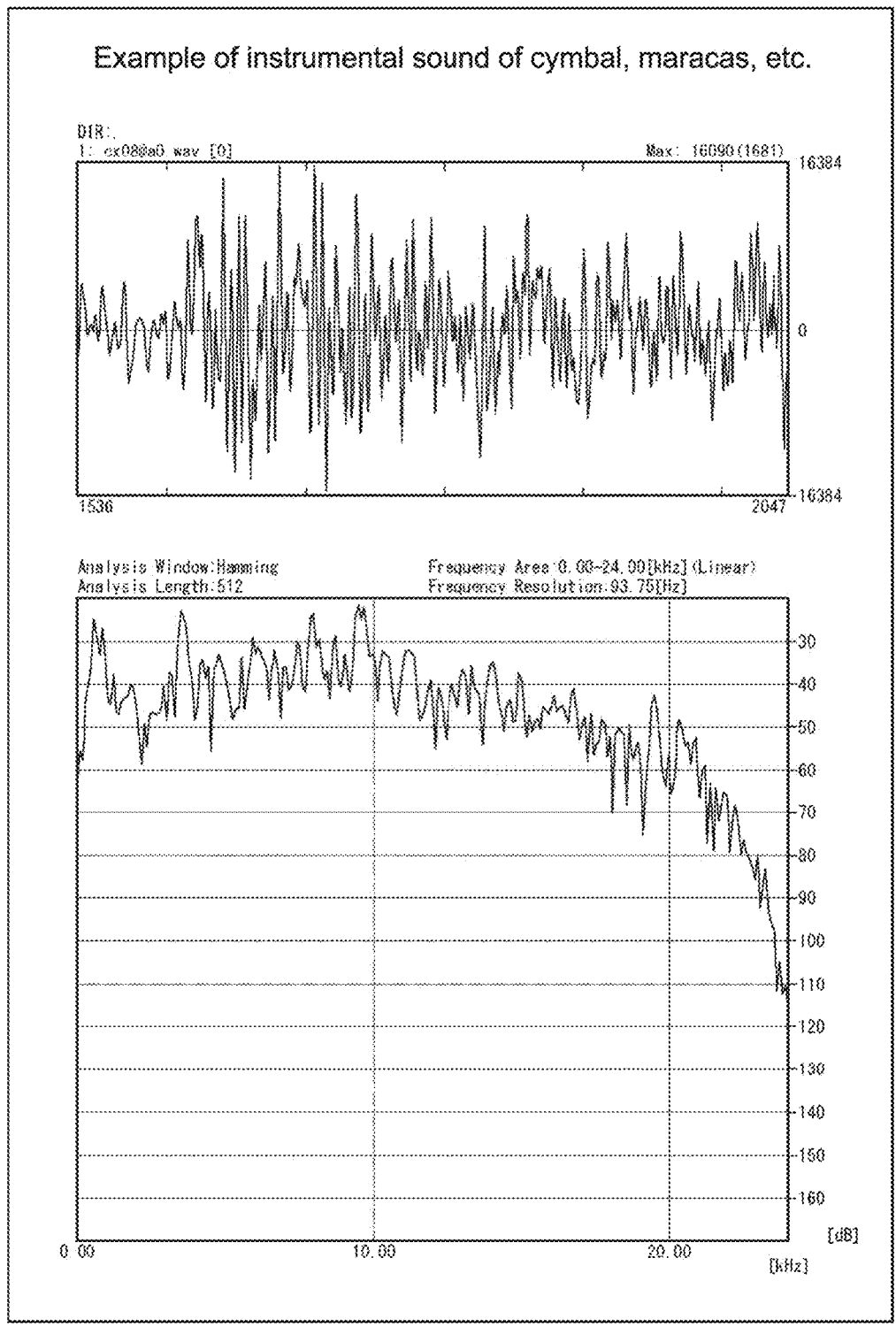
FIG. 12 A waveform diagram showing an example of acoustic data from which insertion and discard are hard to be detected.

FIG. 12 shows examples of a time waveform (upper side) and frequency distribution (lower side) of acoustic data of instrumental sound of a cymbal, maracas, etc.

It can be confirmed that the randomness of acoustic data in FIG. 9 to FIG. 12 is high.

As described above, acoustic data with a high randomness is hard to be detected (by a sense of hearing) even when insertion or discard is performed in a minute section. Therefore, in the control information generation unit 52, control information of 1 indicating that insertion and discard are accepted is generated for encoded data corresponding to acoustic data with a high randomness.

Figure 13:
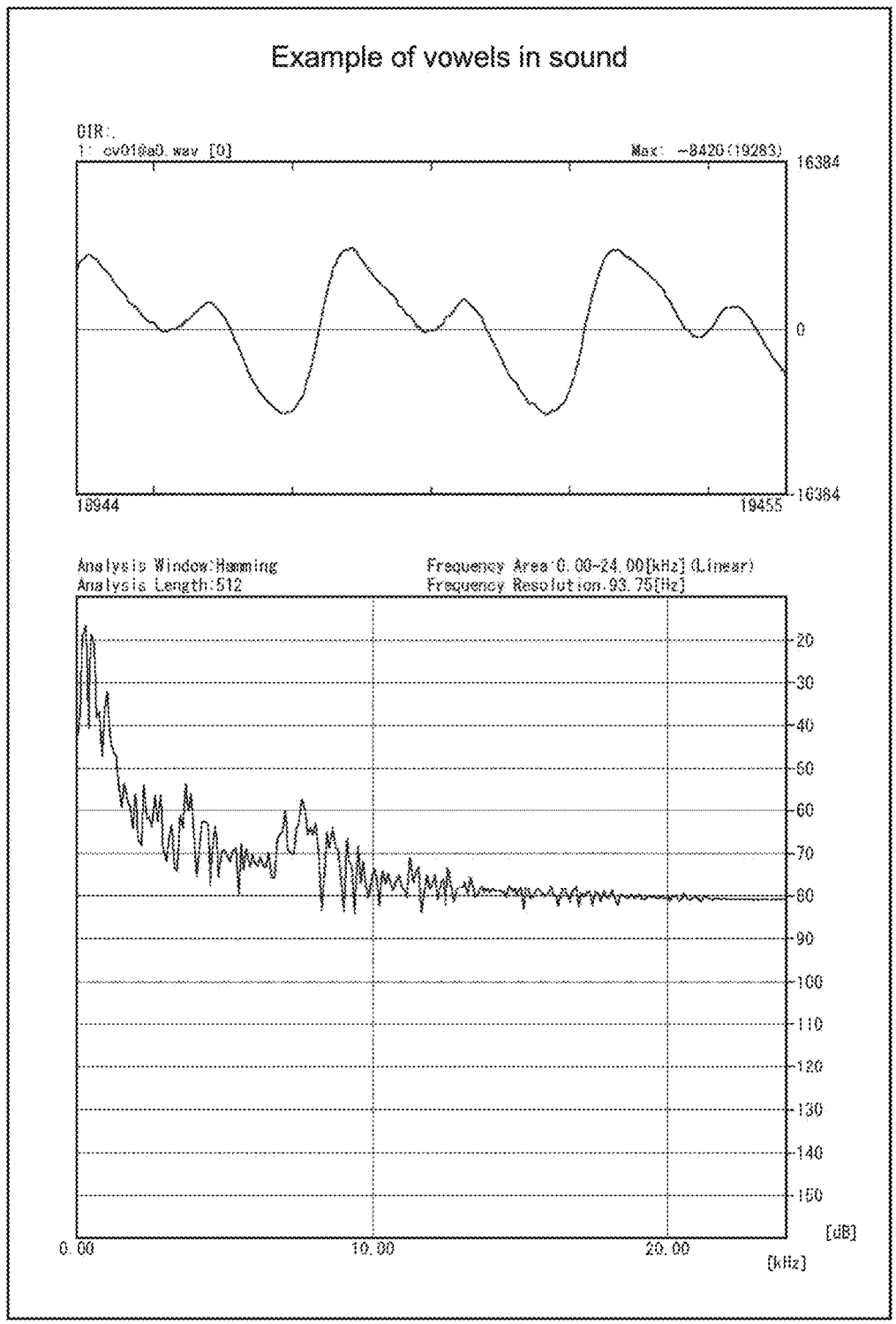
FIG. 13 A waveform diagram showing an example of acoustic data of vowels in sound.

FIG. 13 shows examples of a time waveform (upper side) and frequency distribution (lower side) of acoustic data of vowels in sound.

As shown in FIG. 13, the randomness of acoustic data of vowels in sound is not high, and insertion or discard is easy to be detected even in a minute section.

In the control information generation unit 52, control information of 0 indicating that insertion and discard are prohibited is generated for encoded data corresponding to acoustic data of vowels in sound with no high randomness as shown in FIG. 13.

Note that the non-detectable effects in which insertion or discard of acoustic data with a high randomness is hard to be detected depend on the time length of acoustic data in which insertion or discard is performed.

By the experiment performed by the present inventors, it has been confirmed that the time length of acoustic data in which the non-detectable effects are valid is a minute section of approximately several milliseconds and sound break is easy to be detected when insertion or discard is performed and the time length exceeds approximately 10 milliseconds, for example, even in the case where the randomness of acoustic data is high.

Therefore, the encoded data to which control information is added is desirably encoded data corresponding to acoustic data of a frame size of the time length of not more than several milliseconds.

Further, even when the encoded data to which control information is added is encoded data corresponding to acoustic data of a frame size of the time length of not more than several milliseconds, the time length of acoustic data in which insertion or discard is performed exceeds approximately 10 milliseconds in total and the non-detectable effects are not valid in some cases when insertion or discard of the encoded data is successively performed.

Therefore, it is desirable to restrict the generation of control information so that the section in which control information of 1 indicating that insertion and discard are accepted is generated does not continue exceeding approximately 10 milliseconds. Alternatively, when such restriction is not performed, it is desirable to restrict insertion or discard of encoded data so that the section in which insertion or discard is performed does not continue exceeding approximately 10 milliseconds.

<Insertion of Data>

Figure 14:
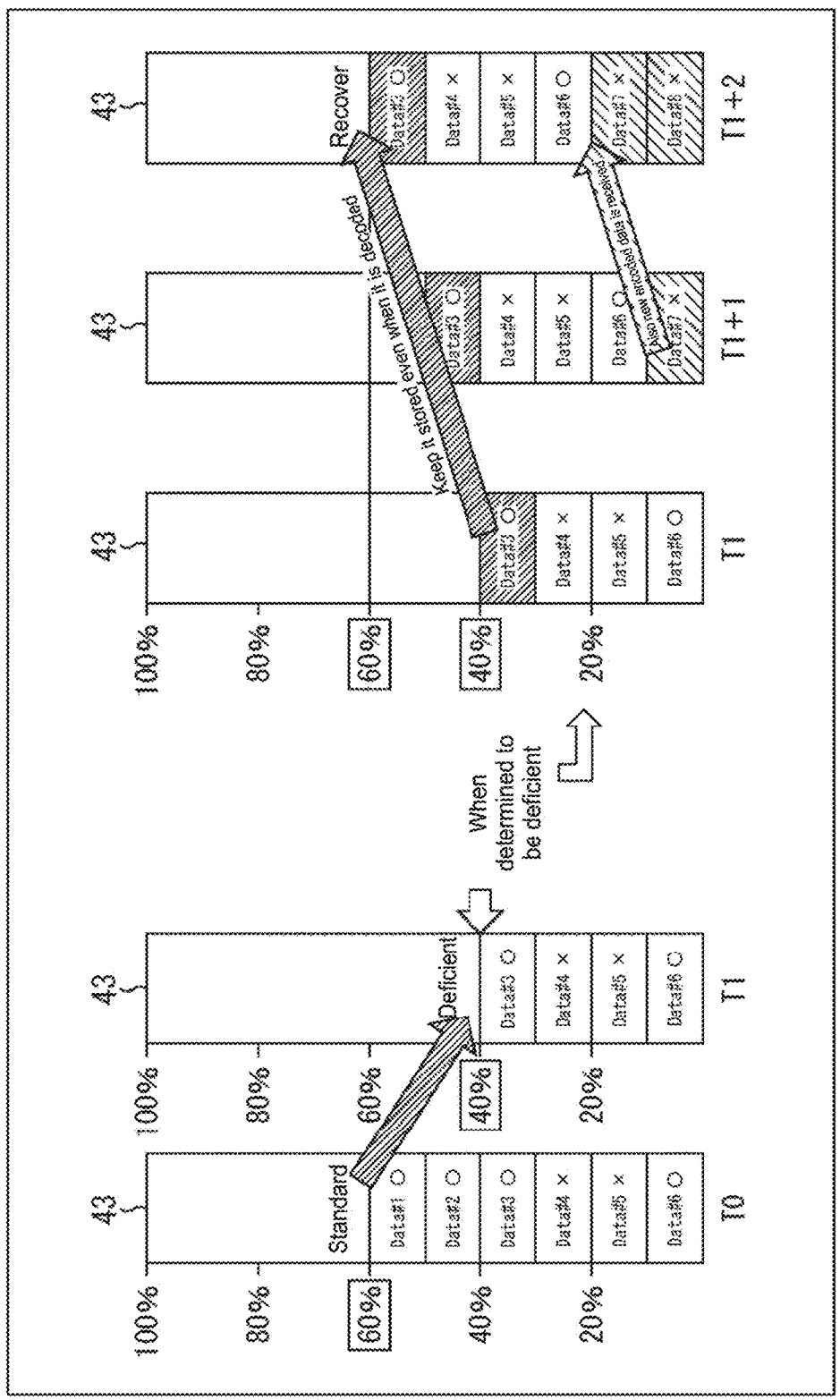
FIG. 14 A diagram describing insertion of data performed in the communication apparatus 21.

FIG. 14 is a diagram describing insertion of data (encoded data) performed in the communication apparatus 21 of the reception side.

In the communication apparatus 21, when the storage amount of the data buffer 43 is reduced and the data buffer 43 is likely to underflow, the data control unit 61 increases the storage amount of the data buffer 43 by copying encoded data as insertion of the encoded data to which control information of 1 is added.

FIG. 14 is a diagram showing an example of the change in the storage amount of the data buffer 43.

When transmission of (encoded data acquired by encoding) acoustic data from the communication apparatus 12 to the communication apparatus 21 is started, data-with-control-information acquired by adding control information of 1

(0) or 0 (×) to encoded data is stored in the data buffer 43 in the communication apparatus 21.

In FIG. 14, data-with-control-information is stored in the data buffer 43, and reading of encoded data in data-with-control-information from the data buffer 43 is started at a time T0 when the storage amount of the data buffer 43 is increased to 60% of the capacity (of the data buffer 43).

Note that pieces of data-with-control-information Data #1, Data #2, Data #3, Data #4, Data #5, and Data #6 are stored in the data buffer 43 at the time T0.

Further, pieces of control information in the pieces of data-with-control-information Data #1 to Data #6 are 1 (0), 1 (0), 1 (0), 0 (×), 0 (×), and 1 (0), respectively.

Note that also the encoded data in the data-with-control-information Data #i is appropriately referred to as the encoded data Data #i similarly to the data-with-control-information Data #i.

The encoded data read from the data buffer 43 is supplied to the data output unit 62, decoded in the data output unit 62, and then, output to the output apparatus 22 via the LPCM buffer 45.

In the case where data-with-control-information from the communication apparatus 12 cannot be received in the communication apparatus 21 due to some causes after reading of encoded data from the data buffer 43 at the time T0 is started, the data-with-control-information is not supplied to the data buffer 43 but the reading of encoded data from the data buffer 43 is continued.

Therefore, the storage amount of the data buffer 43 is reduced by the amount corresponding to (data-with-control-information including) encoded data read from the data buffer 43 and decoded by the data output unit 62.

In FIG. 14, at a time T1 (>T0), the pieces of encoded data Data #1 and Data #2 are read from the data buffer 43 and the storage amount of the data buffer 43 is reduced to 40% of the capacity.

In the communication apparatus 21, when the storage amount of the data buffer 43 is reduced to a threshold value of the storage amount for preventing the underflow from occurring (hereinafter, referred to also as the lower limit threshold value), e.g., 40% (or less) of the capacity, the data control unit 61 performs insertion of (encoded data included in) data-with-control-information based on control information as control of the method of using data based on control information to prevent sound break from occurring due to the underflow of the data buffer 43.

Specifically, at the time T1, the data control unit 61 reads the encoded data Data #3 to be read next from the data buffer 43, and supplies it to the data output unit 62. Note that because the control information added to the encoded data Data #3 is 1 (0) indicating that insertion and discard are accepted, the data control unit 61 causes the data buffer 43 to hold the encoded data Data #3 by copying the encoded data Data #3 as it is.

Therefore, at a next time T1+1, the encoded data to be read next from the data buffer 43 is the encoded data Data #3 again.

Now, assumption is made that an appropriate value as the storage amount of the data buffer 43 (hereinafter, referred to also as the reference value) to stably supply acoustic data from the communication apparatus 21 to the output apparatus 22 is 60% of the capacity of the data buffer 43, for example. At the time T1+1, the storage amount of the data buffer 43 does not recover to 60% of the capacity as the reference value. The data control unit 61 continues to perform insertion of the encoded data based on control information until the storage amount recovers to the reference value after the storage amount of the data buffer 43 reaches not more than the lower limit threshold value.

Specifically, at the time T1+1, the data control unit 61 reads the encoded data Data #3 from the data buffer 43 and supplies it to the data output unit 62. Because the control information added to the encoded data Data #3 is 1 (0) indicating that insertion and discard are accepted, the data control unit 61 causes the data buffer 43 to hold the encoded data Data #3 by copying the encoded data Data #3 as it is again.

After that, assumption is made that the communication apparatus 21 is capable of receiving data-with-control-information from the communication apparatus 12 and receives data-with-control-information Data #7. The data-with-control-information Data #7 is newly stored in the data buffer 43.

The encoded data Data #3 is held in the data buffer 43 as it is and the data-with-control-information Data #7 is newly stored in the data buffer 43, thereby increasing the storage amount of the data buffer 43.

Note that in FIG. 14, the storage amount of the data buffer 43 does not recover to the reference value (60% of the capacity) even when the data-with-control-information Data #7 is newly stored in the data buffer 43.

Further, the encoded data to be read next from the data buffer 43 is the encoded data Data #3 again.

Therefore, the data control unit 61 reads the encoded data Data #3 from the data buffer 43, and supplies it to the data output unit 62. Further, because the control information added to the encoded data Data #3 is 1 (0) indicating that insertion and discard are accepted, the data control unit 61 causes the data buffer 43 to hold the encoded data Data #3 by copying the encoded data Data #3 as it is.

After that, in FIG. 14, at a time T1+2, the communication apparatus 21 receives data-with-control-information Data #8 from the communication apparatus 12, and the data-with-control-information Data #8 is newly stored in the data buffer 43.

In FIG. 14, the data-with-control-information Data #8 is newly stored in the data buffer 43, and thus, the storage amount of the data buffer 43 recovers to the reference value (60% of the capacity).

In the case where the storage amount of the data buffer 43 recovers to the reference value as described above, the encoded data Data #3 to be read next from the data buffer 43 is read from the data buffer 43, supplied to the data output unit 62, and then, is not held in the data buffer 43 (is discarded).

Note that in FIG. 14, insertion of the encoded data Data #3 is successively performed two times, and the encoded data Data #3 is successively read from the data buffer 43 three times in total and decoded, in order to make the description easy.

Actually, it is possible to prevent sound break from occurring due to the underflow of the data buffer 43 without causing a feeling of strangeness of a user by restricting control of the method of using data based on control information by the data output unit 61 so that insertion of encoded data is performed at a rate of encoded data corresponding to a section of approximately one frame of encoded data corresponding to a section of approximately several ten to several hundred frames, for example.

Specifically, in the case where the storage amount of the data buffer 43 reaches not more than the lower limit threshold value and does not recover to the reference value, even when control information is 1 (0) indicating that insertion and discard are accepted, insertion of encoded data to which the control information is added does not necessarily need to be performed and may be performed only when a predetermined condition is satisfied.

Specifically, the insertion of encoded data to which control information that is 1 indicating that insertion and discard are accepted is added can be performed for every encoded data corresponding to acoustic data of a predetermined number of frames such as several ten to several hundred frames at most.

The insertion of encoded data to which control information that is 1 indicating that insertion and discard are accepted is added for every encoded data corresponding to acoustic data of a predetermined number of frames at most can be performed by restricting insertion of encoded data from when insertion or discard of encoded data is performed to when encoded data corresponding to acoustic data of a predetermined number of frames is read from the data buffer 43.

Specifically, assumption is made that a predetermined condition is defined as that insertion or discard of encoded data is not performed and encoded data corresponding to acoustic data of a predetermined number of frames is read from the data buffer 43 since the previous insertion or discard of encoded data has been performed (hereinafter, referred to also as the number-of-times condition). It is possible to restrict the insertion of encoded data to be performed for every encoded data corresponding to acoustic data of a predetermined number of frames at most by performing insertion of encoded data to which control information of 1 indicating that insertion and discard are accepted is added when at least the number-of-times condition is satisfied.

In accordance with the number-of-times condition, it is possible to adjust the rate (frequency) of performing insertion of encoded data. The number-of-times condition can be set by, for example, how much the storage amount of the data buffer 43 is adjusted per unit time.

Note that although insertion of (encoded data acquired by encoding) acoustic data transmitted from the communication apparatus 12 is performed as insertion of data in the communication apparatus 21 here, acoustic data from which insertion or discard is hard to be detected, i.e., silent data, noise data, and the like can be prepared as data for insertion in advance and the data for insertion can be inserted in the communication apparatus 21 as the insertion of data, in addition to the insertion of acoustic data transmitted from the communication apparatus 12.

Specifically, in the insertion of data of the data control unit 61, data to be inserted into acoustic data transmitted from the communication apparatus 12 does not necessarily need to be (a copy of) the acoustic data, and may be data for insertion that is separately prepared.

<Discard of Data>

Figure 15:
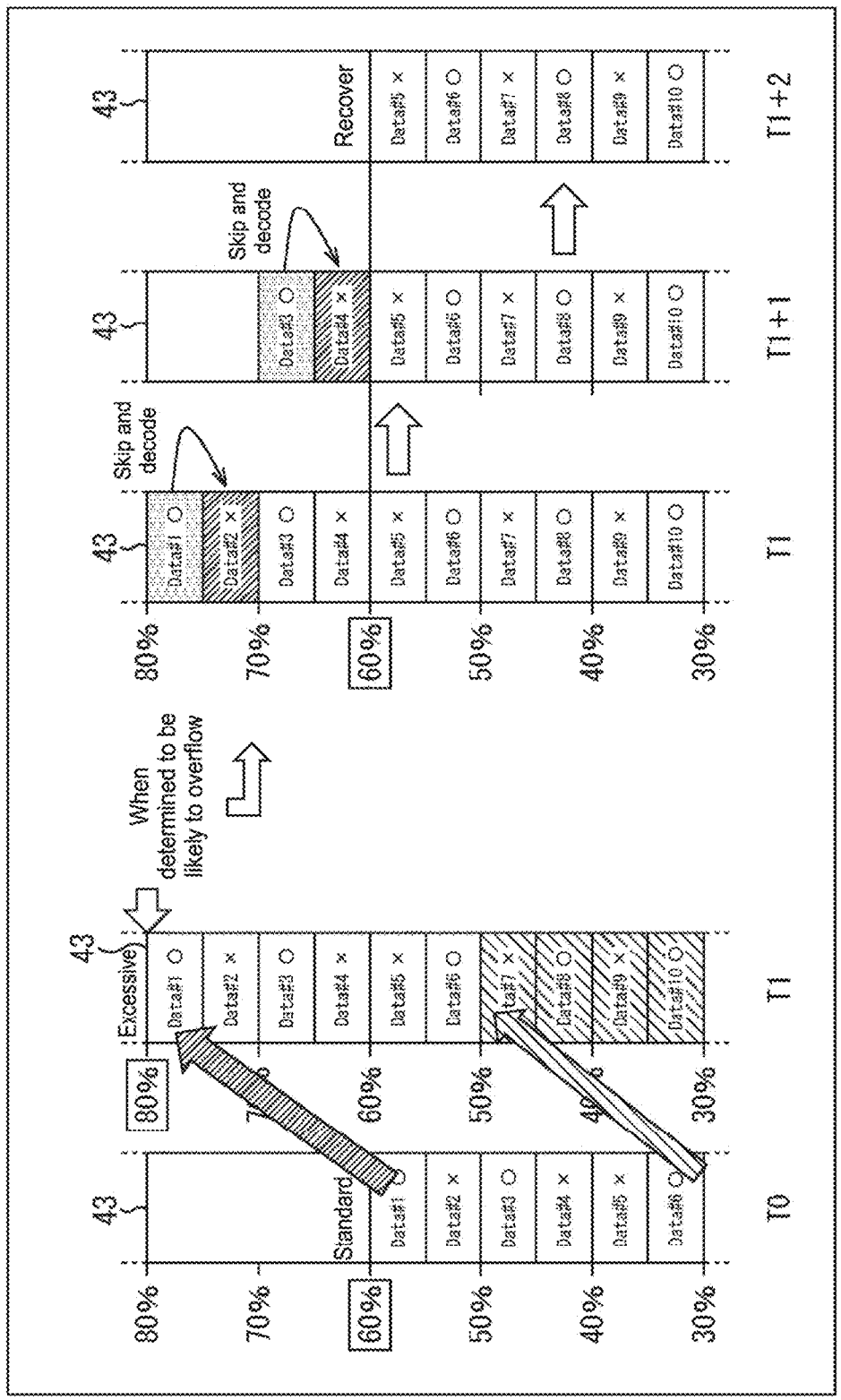
FIG. 15 A diagram describing discard of data performed in the communication apparatus 21.

FIG. 15 is a diagram describing discard of encoded data performed in the communication apparatus 21 of the reception side.

In the communication apparatus 21, in the case where the storage amount of the data buffer 43 is increased and the data buffer 43 is likely to overflow, the data control unit 61 discards encoded data from the data buffer 43 to reduce the storage amount of the data buffer 43 by skipping the reading of the encoded data to which control information of 1 is added from the data buffer 43.

FIG. 15 is a diagram showing an example of the change in the storage amount of the data buffer 43.

When transmission of (encoded data acquired by encoding) acoustic data from the communication apparatus 12 to the communication apparatus 21 is started, data-with-control-information acquired by adding control information of 1 (0) or 0 (×) to encoded data is stored in the data buffer 43 in the communication apparatus 21.

In FIG. 15, data-with-control-information is stored in the data buffer 43, and the storage amount of the data buffer 43 is increased to 60% of the capacity at the time T0.

At the time T0, at least the pieces of data-with-control-information Data #1 to Data #6 are stored in the data buffer 43.

Further, pieces of control information in the pieces of data-with-control-information Data #1 to Data #6 are 1 (0), 0 (×), 1 (0), 0 (×), 0 (×), and 1 (0), respectively.

When the storage amount of the data buffer 43 is increased to 60% of the capacity as the reference value, reading of encoded data in data-with-control-information from the data buffer 43 is started. In FIG. 15, right before reading of encoded data from the data buffer 43 is started, data-with-control-information is successively transmitted from the communication apparatus 12 to the communication apparatus 21 due to some causes, and the storage amount of the data buffer 43 is rapidly increased and reaches a threshold value of the storage amount for preventing the overflow from occurring (hereinafter, referred to as the upper limit threshold value), e.g., 80% of the capacity at the time T1.

Note that in FIG. 15, after the storage amount of the data buffer 43 is increased to the reference value, data-with-control-information is further supplied to the data buffer 43 before (encoded data in) the data-with-control-information Data #1 to be read first is read from the data buffer 43. Accordingly, at the time T1, at least pieces of data-with-control-information Data #7, Data #8, Data #9, and Data #10 are stored in the data buffer 43 in addition to the pieces of data-with-control-information Data #1 to Data #6.

Pieces of control information in the pieces of data-with-control-information Data #7 to Data #10 are 0 (×), (0), 0 (×), and 1 (0), respectively.

In the communication apparatus 21, when the storage amount of the data buffer 43 reaches the upper limit threshold value (or more) and the data buffer 43 is likely to overflow, the data control unit 61 performs discard of (encoded data included in) data-with-control-information based on control information as control of the method of using data based on the control information to prevent sound break from occurring due to the overflow.

Specifically, although the encoded data to be read next from the data buffer 43 in which at least the pieces of data-with-control-information Data #1 to Data #10 are stored at the time T1 is the encoded data Data #1 (included in the data-with-control-information Data #1), control information added to the encoded data Data #1 is 1 (0) indicating that insertion and discard are accepted. Therefore, the data control unit 61 skips reading of the encoded data Data #1 from the data buffer 43 and discards the encoded data Data #1.

In the case where reading of the encoded data Data #1 from the data buffer 43 is skipped, the encoded data to be read next is the encoded data Data #2 and the control information added to the encoded data Data #2 is 0 (×) indicating that insertion and discard are prohibited.

Therefore, since the discard of the encoded data Data #2 is not accepted, the data control unit 61 reads the encoded data Data #2 (included in the data-with-control-information Data #2) from the data buffer 43 and supplies it to the data output unit 62 at the time T1. In the data output unit 62, the encoded data Data #2 from the data buffer 43 is decoded and output to the output apparatus 22 via the LPCM buffer 45.

At the time T1+1 after the encoded data Data #2 is read from the data buffer 43, the encoded data to be read next from the data buffer 43 is the encoded data Data #3.

Further, at the time T1+1, the storage amount of the data buffer 43 does not fall below 60% of the capacity as the reference value. After the storage amount of the data buffer 43 is not less than the upper limit threshold value, the data control unit 61 continues to perform discard of encoded data based on control information until the storage amount recovers to the reference value.

At the time T1+1, the control information added to the encoded data Data #3 to be read next is 1 (0) indicating that insertion and discard are accepted.

Therefore, the data control unit 61 skips reading of the encoded data Data #3 from the data buffer 43, and discards the encoded data Data #3.

In the case where reading of the encoded data Data #3 from the data buffer 43 is skipped, the encoded to be read next is the encoded data Data #4. The control information added to the encoded data Data #4 is 0 (×) indicating that insertion and discard are prohibited.

Therefore, because discard of the encoded data Data #4 is not accepted, the data control unit 61 reads the encoded data Data #4 from the data buffer 43 and supplies it to the data output unit 62 at the time T1+1. In the data output unit 62, the encoded data Data #4 from the data buffer 43 is decoded and output to the output apparatus 22 via the LPCM buffer 45.

At the time T1+2 after the encoded data Data #4 is read from the data buffer 43, the encoded data to be read next from the data buffer 43 is the encoded data Data #5.

Then, at the time T1+2, the storage amount of the data buffer 43 recovers to the reference value (60% of the capacity).

In the case where the storage amount of the data buffer 43 recovers to the reference value as descried above, the encoded data Data #5 to be read next from the data buffer 43 is read from the data buffer 43 and supplied to the data output unit 62 regardless of the control information added to the encoded data Data #5.

Note that in FIG. 15, the discard of encoded data is performed at the consecutive times T1 and T1+1 to make the description easy.

Actually, it is possible to prevent sound break from occurring due to the overflow of the data buffer 43 without causing a feeling of strangeness of a user by restricting control of the method of using data based on control information by the data output unit 61 so that discard of encoded data is performed at a rate of encoded data corresponding to acoustic data of approximately one frame of encoded data corresponding to acoustic data of approximately several ten to several hundred frames, for example.

Specifically, in the case where the storage amount of the data buffer 43 reaches not less than the upper limit threshold value and does not recover to the reference value, even when control information is 1 (0) indicating that insertion and discard are accepted, discard of encoded data to which the control information is added does not necessarily need to be performed and may be performed only when a predetermined condition is satisfied.

Specifically, the discard of encoded data to which control information that is 1 indicating that insertion and discard are accepted is added can be performed for every encoded data corresponding to acoustic data of a predetermined number of frames such as several ten to several hundred frames at most.

The discard of encoded data to which control information that is 1 indicating that insertion and discard are accepted is added for every encoded data corresponding to acoustic data of a predetermined number of frames at most can be performed by restricting discard of encoded data from when discard of encoded data is performed to when encoded data corresponding to acoustic data of a predetermined number of frames is read from the data buffer 43.

For example, in the case where the number-of-times condition described in FIG. 14, i.e., condition that insertion or discard of encoded data is not performed and encoded data corresponding to acoustic data of a predetermined number of frames is read from the data buffer 43 since the previous insertion or discard of encoded data has been performed, is satisfied, it is possible to perform discard of encoded data for every encoded data corresponding to acoustic data of a predetermined number of frames at most by performing discard of encoded data to which control information of 1 indicating that insertion and discard are accepted is added.

In accordance with the number-of-times condition, it is possible to adjust the rate for performing discard of encoded data. The number-of-times condition can be set by, for example, how much the storage amount of the data buffer 43 is adjusted per unit time as described in FIG. 14.

<Transmission Processing>

Figure 16:
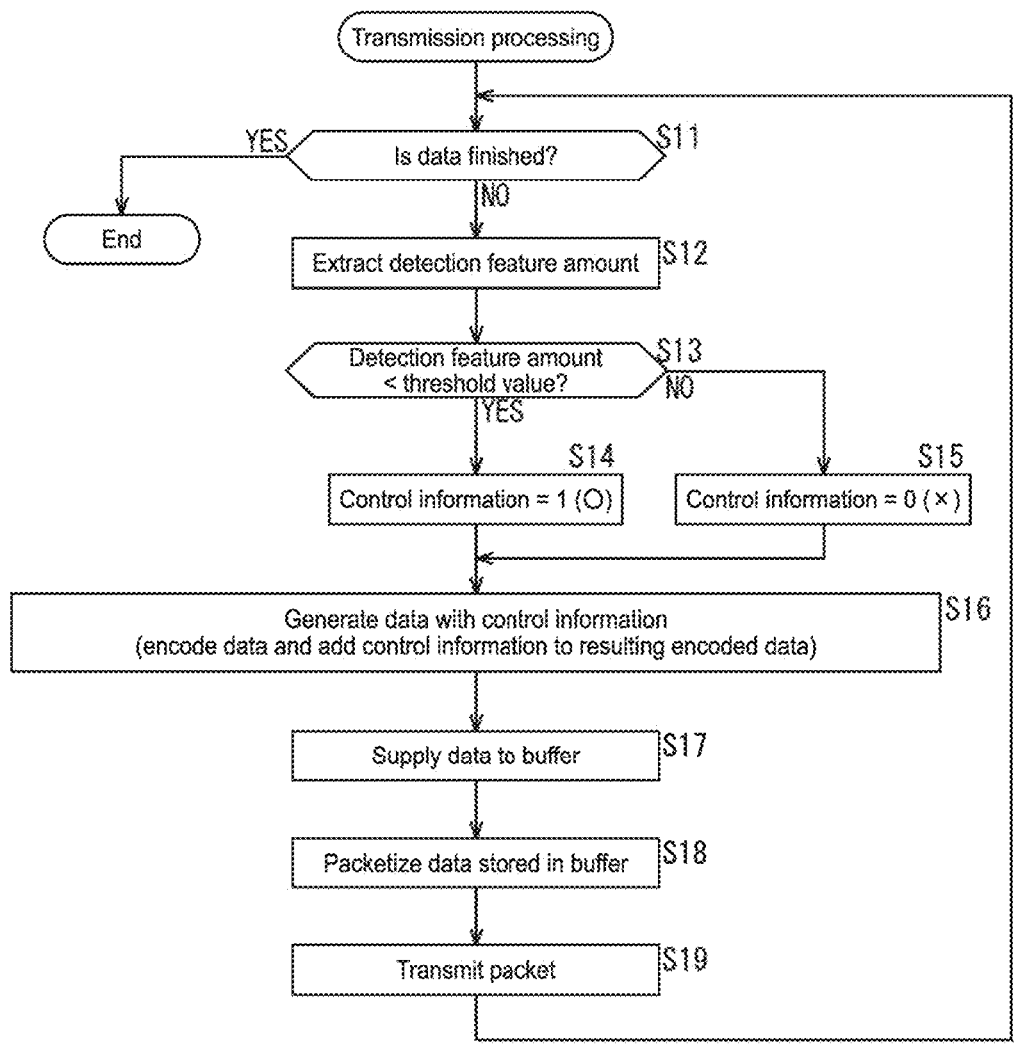
FIG. 16 A flowchart describing an example of transmission processing for transmitting acoustic data performed by the communication apparatus 12.

FIG. 16 is a flowchart describing an example of transmission processing for transmitting acoustic data performed by the communication apparatus 12 of the transmission side in FIG. 7.

The transmission processing is started when, for example, acoustic data is supplied from the supplying apparatus 11 to the communication apparatus 12.

In Step S11, the data generation unit 51 determines whether or not the acoustic data supplied from the supplying apparatus 11 is finished. In the case where it is determined that the data is not finished, the data generation unit 51 divides the LPCM data supplied from the supplying apparatus 11 into frames and supplies it to the control information generation unit 52, and the processing proceeds to Step S12.

In Step S12, the control information generation unit 52 extracts (generates), from a frame of the LPCM data from the data generation unit 51, a detection characteristic amount that represents the degree that insertion or discard of the frame is detected, and the processing proceeds to Step S13.

In Step S13, the control information generation unit 52 compares the detection characteristic amount of the frame of the LPCM data from the data generation unit 51 with a threshold value, and generates control information for encoded data corresponding to the frame of the LPCM data from the data generation unit 51 depending on the comparison results in Step S14 or S15.

Specifically, in Step S13, the control information generation unit 52 determines whether or not the detection characteristic amount of the frame of the LPCM data from the data generation unit 51 is less than (or not more than) the threshold value of the detection characteristic amount.

In the case where it is determined that the detection characteristic amount is less than the threshold value, i.e., the frame of the LPCM data from the data generation unit 51 is, for example, noisy acoustic data and insertion or discard thereof is hard to be detected in Step S13, the processing proceeds to Step S14.

In Step S14, the control information generation unit 14 generates control information of 1 (0) indicating that insertion and discard are accepted for encoded data corresponding to the frame of the LPCM data from the data generation unit 51 and supplies it to the data generation unit 51, and the processing proceeds to Step S16.

On the other hand, in the case where it is determined that the detection characteristic amount is not less than the threshold value, i.e., the frame of the LPCM data from the data generation unit 51 is, for example, tone-based acoustic data and insertion or discard thereof is not hard to be detected in Step S13, the processing proceeds to Step S15.

In Step S15, the control information generation unit 14 generates control information of 0 (×) indicating that insertion and discard are accepted for encoded data corresponding to the frame of the LPCM data from the data generation unit 51 and supplies it to the data generation unit 51, and the processing proceeds to Step S16.

In Step S16, the data generation unit 51 generates data-with-control-information for the frame of the LPCM data.

Specifically, the data generation unit 51 generates data-with-control-information by encoding the frame of the LPCM data and adding the control information from the control information generation unit 14 to the resulting encoded data, and the processing proceeds from Step S16 to Step S17.

In Step S17, the data generation unit 51 supplies the data-with-control-information to the data buffer 32, and causes the data buffer 32 to store it.

The data-with-control-information stored in the data buffer 32 is appropriately read and supplied to the packetizing unit 33.

When the data-with-control-information is supplied from the data buffer 43, the packetizing unit 33 packetizes the data-with-control-information into packets and supplies it to the communication unit 34 in Step S18, and the processing proceeds to Step S19.

In Step S19, the communication unit 34 modulates the packet from the packetizing unit 33 to an RF signal, and wirelessly transmits it.

After that, the processing returns from Step S19 to Step S11, and similar processing is repeated thereafter.

Then, in the case where it is determined that acoustic data supplied from the supplying apparatus 11 is finished, i.e., there is no acoustic data to be transmitted in Step S11, the transmission processing is finished.

Note that although the processing of Step S11 to S19 is sequentially performed in FIG. 16 to make the description easy, actually, repetition of the processing of Step S11 to S17 and repetition of the processing of Step S18 and S19 are performed in parallel.

<Reception Processing>

Figure 17:
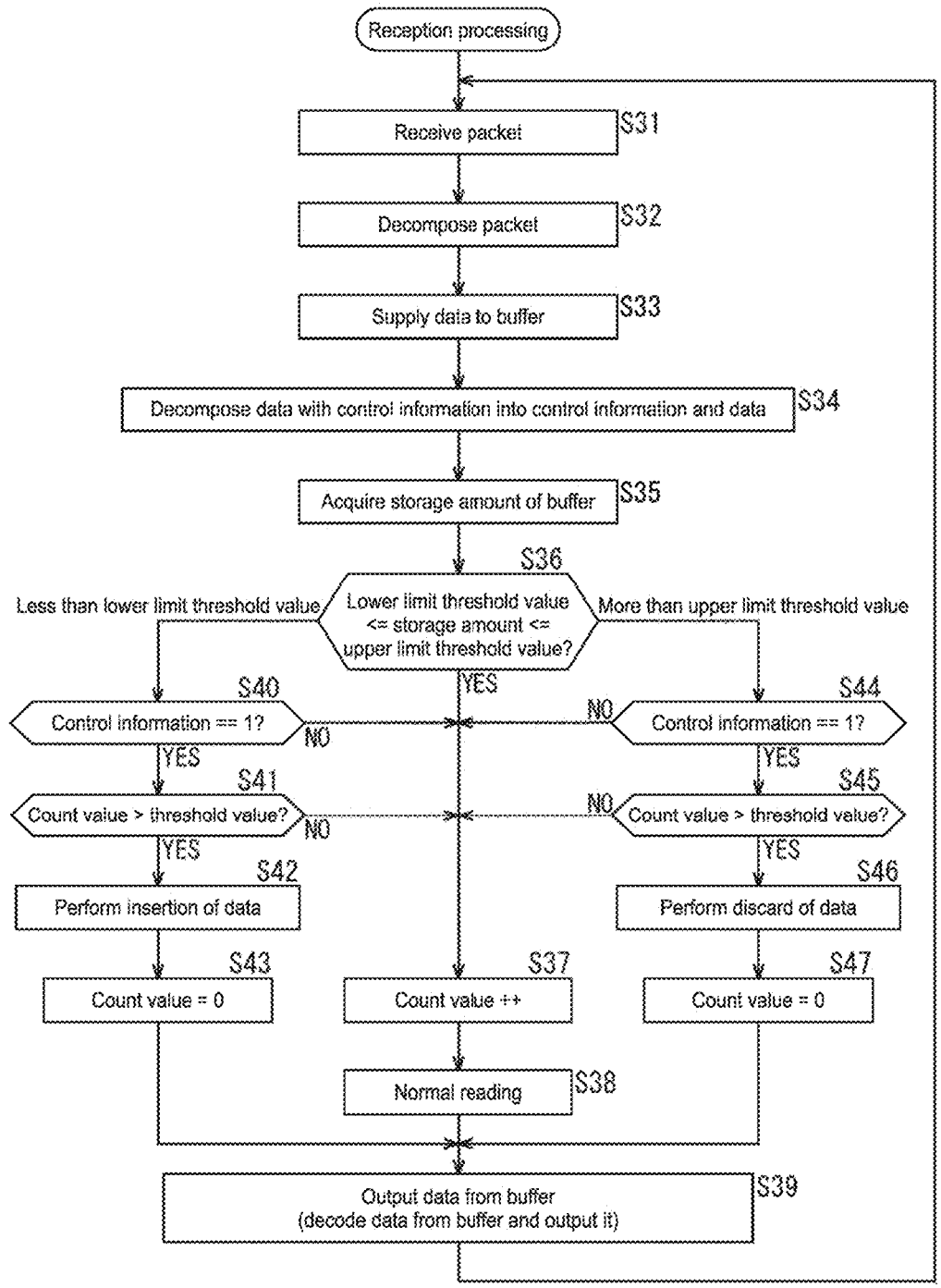
FIG. 17 A flowchart describing an example of reception processing for receiving acoustic data performed by the communication apparatus 21.

FIG. 17 is a flowchart describing an example of reception processing for receiving acoustic data performed by the communication apparatus 21 of the reception side in FIG. 7.

In Step S31, the communication unit 41 stands by for transmission of an RF signal of a packet from the communication unit 34, receives it, and demodulates the packet from the RF signal. Then, the communication unit 41 supplies the packet to the packet decomposing unit 42, and the processing proceeds from Step S31 to Step S32.

The packet decomposing unit 42 decomposes the packet from the communication unit 41 and extracts data-with-control-information from the packet in Step S32, and the processing proceeds to Step S33.

The packet decomposing unit 42 supplies the data-with-control-information to the data buffer 43 and causes the data buffer 43 to store it in Step S33, and the processing proceeds to Step S34.

The data control unit 61 decomposes data-with-control-information stored in the data buffer 43 into encoded data and control information added to the encoded data in Step S34, and the processing proceeds to Step S35.

The data control unit 61 acquires the storage amount of the data buffer 43 in Step S35, and the processing proceeds to Step S36.

In Step S36, the data control unit 61 determines whether or not the storage amount of the data buffer 43 is within a proper range in which the data buffer 43 does not overflow or underflow even when there is a somewhat rapid increase or decrease in the storage amount, i.e., the storage amount of the data buffer 43 is not less than the lower limit threshold value (or larger than the lower limit threshold value) and not more than the upper limit threshold value (or less than the upper limit threshold value).

In the case where it is determined that the storage amount of the data buffer 43 is not less than the lower limit threshold value and not more than the upper limit threshold value in Step S36, the processing proceeds to Step S37. The data control unit 61 increments the number-of-times count value for counting the number of times of successively reading data from the data buffer 43 by one in Step S37, and the processing proceeds to Step S38.

The data control unit 61 reads temporarily most preceding (oldest) encoded data (hereinafter, referred to also as the oldest encoded data) from the data buffer 43 and causes the data buffer 43 to supply it to the data output unit 62 in Step S38, and the processing proceeds to Step S39.

Note that the reading of the oldest encoded data from the data buffer 43 performed in Step S38 is referred to as normal reading, hereinafter. In the normal reading, (data-with-control-information including) the encoded data read from the data buffer 43 is discarded (deleted) from the data buffer 43.

The data output unit 62 decodes the encoded data supplied from the data buffer 43 and outputs the resulting LPCM data to the output apparatus 22 via the LPCM buffer 45 in Step S39, and the processing returns to Step S31.

On the other hand, in the case where it is not determined that the storage amount of the data buffer 43 is less than the lower limit threshold value, i.e., the data buffer 43 is likely to underflow in Step S36, the processing proceeds to Step S40.

In Step S40, the data control unit 61 determines whether or not the control information added to the oldest encoded data stored in the data buffer 43 is 1 (0) indicating that insertion and discard are accepted.

In the case where it is determined that the control information added to the oldest encoded data is not (0) indicating that insertion and discard are accepted in Step S40, the processing proceeds to Step S37 and the above-mentioned processing is performed thereafter.

Further, in the case where it is determined that the control information added to the oldest encoded data is (0) indicating that insertion and discard are accepted in Step S40, the processing proceeds to Step S41.

In Step S41, the data control unit 61 determines whether or not the number-of-times condition is satisfied, i.e., the number-of-times count value is not less than (or larger than) the threshold value of the number-of-times count value.

In the case where it is determined that the number-of-times count value is less than the threshold value, i.e., the normal reading is not successively performed the number of times not less than the threshold value and a time is not elapsed so much since the previous data insertion or discard is performed in Step S41, the processing proceeds to Step S37 and the above-mentioned processing is performed thereafter.

Further, in the case where it is determined that the number-of-times count value is not less than the threshold value, i.e., the normal reading is successively performed the number of times not less than the threshold value since the previous data insertion or discard is performed and a certain time is elapsed since the previous data insertion or discard is performed in Step S41, the processing proceeds to Step S42.

The data control unit 61 performs insertion of the oldest encoded data stored in the data buffer 43 in Step S42, as shown in FIG. 14, and the processing proceeds to Step S43.

Specifically, the data control unit 61 reads the oldest encoded data from the data buffer 43, causes the data buffer 43 to supply it to the data output unit 62, and inserts a copy of the oldest encoded data after the oldest encoded data by causing the data buffer 43 to hold the copy of the oldest encoded data as it is.

The data control unit 61 resets the number-of-times count value to 0 in Step S43, the processing proceeds to Step S39, and the above-mentioned processing is performed thereafter.

On the other hand, in the case where it is determined that the storage amount of the data buffer 43 is more than the upper limit threshold value, i.e., the data buffer 43 is likely to overflow in Step S36, the processing proceeds to Step S44.

In Steps S44 and S45, the processing similar to that in Steps S40 and S41 is performed.

Specifically, in Step S44, the data control unit 61 determines whether or not the control information added to the oldest encoded data stored in the data buffer 43 is 1 (0) indicating that insertion and discard are accepted.

In the case where it is determined that the control information added to the oldest encoded data is not 1 (0) indicating that insertion and discard are accepted in Step S44, the processing proceeds to Step S37 and the above-mentioned processing is performed thereafter.

Further, in the case where it is determined that the control information added to the oldest encoded data is 1 (0) indicating that insertion and discard are accepted in Step S44, the processing proceeds to Step S45.

In Step S45, the data control unit 61 determines whether or not the number-of-times condition is satisfied, i.e., the number-of-times count value is not less than the threshold value of the number-of-times count value.

In the case where it is determined that the number-of-times count value is less than the threshold value, i.e., the number-of-times condition is not satisfied in Step S45, the processing proceeds to Step S37 and the above-mentioned processing is performed thereafter.

Further, in the case where it is determined that the number-of-times count value is not less than the threshold value, i.e., the number-of-times condition is satisfied in Step S45, the processing proceeds to Step S46.

The data control unit 61 performs discard of the oldest encoded data stored in the data buffer 43 in Step S46, as shown in FIG. 15, and the processing proceeds to Step S47.

Specifically, the data control unit 61 discards the oldest encoded data stored in the data buffer 43, reads the second oldest encoded data from the data buffer 43, and causes the data buffer 43 to supply it to the data output unit 62.

The data control unit 61 resets the number-of-times count value to 0 in Step S47, the processing proceeds to Step S39, and the above-mentioned processing is performed thereafter.

Note that although the processing of Steps S31 to S47 is sequentially performed in FIG. 17 to make the description easy, actually, the repetition of the processing of Step S31 to S34 and the repetition of the processing of Step S35 to S47 are performed in parallel. Further, although the insertion of encoded data (Steps S40 to S43) is performed only in the case where the storage amount of the data buffer 43 is lower than the lower limit threshold value in FIG. 17 to make the description easy, the insertion of encoded data can be performed from when the storage amount of the data buffer 43 is lower than the lower limit threshold value to when the storage amount returns to the reference value, as described in FIG. 14, for example. Similarly, although the discard of encoded data (Steps S44 to S47) is performed only in the case where the storage amount of the data buffer 43 is larger than the upper limit threshold value in FIG. 17, the discard of encoded data can be performed from when the storage amount of the data buffer 43 is larger than the upper limit threshold value to when the storage amount returns to the reference value, as described in FIG. 15, for example. As the timing when the insertion or discard of encoded data is performed, other various variations can be employed.

As described above, the communication apparatus 12 of the transmission side generates control information for controlling the method of using acoustic data, i.e., control information that is, for example, a flag indicating that insertion or deletion of data is accepted or prohibited on the basis of a detection characteristic amount of acoustic data, adds it to (encoded data acquired by encoding) acoustic data, and transmits it.

On the other hand, the communication apparatus 21 of the reception side controls the method of using acoustic data on the basis of control information added to the acoustic data, and outputs acoustic data whose use method is controlled on the basis of the control information. Specifically, in the communication apparatus 21, insertion or discard of (encoded data acquired by encoding) acoustic data stored in the data buffer 43 is performed and the acoustic data on which the insertion or discard is performed is output on the basis of the control information and the storage amount of the data buffer 43, for example.

Therefore, the storage amount of the data buffer 43 in the communication apparatus 21 of the reception side is adjusted within a proper range, and also the storage amount of the data buffer 32 in the communication apparatus 12 of the transmission side is adjusted within a proper range as secondary effects. As a result, it is possible to prevent acoustic data from the communication apparatus 21 of the reception side to the output apparatus 22 from being interrupted and sound break from occurring due to the overflow or underflow of the data buffer 32 or 43.

Note that although a flag of one bit indicating that insertion or discard of data is accepted or prohibited is employed as control information in FIG. 16 and FIG. 17 to make the description, information that represents the level of the discard or acceptance of insertion or discard of data such as the four levels of the complete acceptance level, the quasi-acceptance level, the quasi-prohibition level, and the prohibition level can be employed as the control information, for example, as shown in FIG. 7.

In the case where the four levels of the complete acceptance level, the quasi-acceptance level, the quasi-prohibition level, and the prohibition level are employed as the control information, for example, insertion or discard of data can be performed, for example, as follows in the communication apparatus 21 of the reception side.

Specifically, insertion or discard of (encoded data acquired by encoding) acoustic data whose control information is the complete acceptance level can be performed, for example, in the case where the storage amount of the data buffer 43 is less than the lower limit threshold value or larger than the upper limit threshold value.

Insertion or discard of acoustic data whose control information is the quasi-acceptance level can be performed, for example, in the case where the storage amount of the data buffer 43 is less than the lower limit threshold value– A or larger than the upper limit threshold value+A. Note that A represents a predetermined positive value.

Insertion or discard of acoustic data whose control information is the quasi-prohibition level can be performed, for example, in the case where the storage amount of the data buffer 43 is less than A (<the lower limit threshold value– A) or larger than the capacity of the data buffer 43–A (>the upper limit threshold value+A).

Insertion or discard of acoustic data whose control information is the prohibition level is prohibited, for example, regardless of the storage amount of the data buffer 43.

As described above, in the case where information that represents the level of acceptance or prohibition of insertion or discard of data is employed as the control information, insertion or discard of data can be flexibly performed in the communication apparatus 21 of the reception side.

Incidentally, as shown in FIG. 16, the control information generation unit 52 generates control information for accepting or prohibiting insertion and discard of data on the basis of the results obtained by comparing the detection characteristic amount of acoustic data and the threshold value.

Therefore, by setting the threshold value of the detection characteristic amount, it is possible to control generation of the control information.

Hereinafter, threshold value setting processing for setting the threshold value of the detection characteristic amount will be described.

<Threshold Value Setting Processing>

Figure 18:
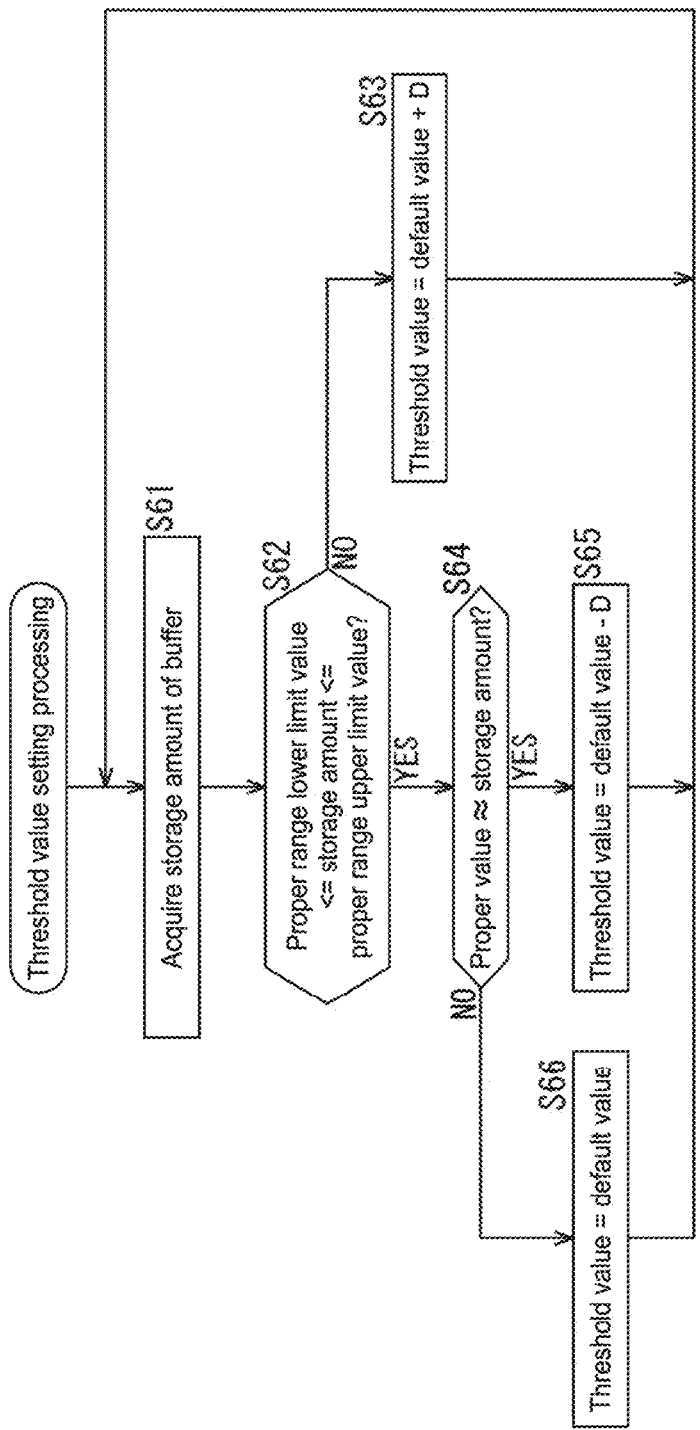
FIG. 18 A flowchart describing an example of processing of setting a first threshold value.

FIG. 18 is a flowchart describing an example of first threshold value setting processing.

The first threshold value setting processing is performed in the communication apparatus 12 of the transmission side.

In Step S61, the control information generation unit 52 in the communication apparatus 12 acquires the storage amount of the data buffer 32 in the communication apparatus 12 of the transmission side, and the processing proceeds to Step S62.

In Step S62, the control information generation unit 52 determines whether or not the storage amount of the data buffer 32 of the transmission side is within a proper range in which the data buffer 32 does not overflow or underflow even when there is a somewhat rapid increase or decrease in the storage amount.

Note that the minimum value and the maximum value of the proper range of the storage amount of the data buffer 32 are respectively referred to also as the proper range lower limit value and the proper range upper limit value. As the proper range lower limit value and the proper range upper limit value, a value not less than the above-mentioned lower limit threshold value and a value not more than the above-mentioned upper limit threshold value can be respectively employed, for example.

In Step S62, whether or not the storage amount of the data buffer 32 is not less than (or larger than) the proper range lower limit value and not more than (or less than) the proper range upper limit value is determined.

In Step S62, in the case where it is determined that the storage amount of the data buffer 32 is not within the proper range, i.e., the data buffer 32 of the transmission side is likely to overflow or underflow due to a rapid increase or decrease in the storage amount, the processing proceeds to Step S63.

In Step S63, the control information generation unit 52 sets the threshold value of the detection characteristic amount to a default value+D that is a large value, and the processing returns to Step S61. Note that D represents a predetermined positive value.

As described above, in the case where the storage amount of the data buffer 32 is not within the proper range and the data buffer 32 is likely to overflow or underflow, the threshold value of the detection characteristic amount is set to the default value+D that is a large value. As a result, control information that represents acceptance of insertion and discard of data is likely to be generated to prevent the data buffer 32 from overflowing or underflowing.

On the other hand, in the case where it is determined that the storage amount of the data buffer 32 is within the proper range in Step S62, the processing proceeds to Step S64.

In Step S64, the control information generation unit 52 determines whether or not the storage amount of the data buffer 32 is equal to (including substantially equal to and can be regarded as being equal to) the proper value (e.g., the median value of the proper range) of the storage amount of the data buffer 32.

In the case where it is determined that the storage amount of the data buffer 32 is equal to the proper value of the storage amount of the data buffer 32 in Step S64, the processing proceeds to Step S65.

The control information generation unit 52 sets the threshold value of the detection characteristic amount to the default value– D that is a small value in Step S65, and the processing returns to Step S61.

As described above, in the case where the storage amount of the data buffer 32 of the transmission side is equal to the proper value and the data buffer 32 is unlikely to overflow or underflow, the threshold value of the detection characteristic amount is set to the default value– D that is a small value. As a result, in the communication apparatus 21 of the reception side, control information that represents prohibition of insertion and discard of data is likely to be generated to prevent insertion or discard of data from being frequently performed.

Further, in the case where it is determined that the storage amount of the data buffer 32 is not equal to the proper value of the storage amount of the data buffer 32, i.e., the storage amount of the data buffer 32 is, for example, within the proper range but has a value close to the proper range lower limit value or the proper range upper limit value in Step S64, the processing proceeds to Step S66.

The control information generation unit 52 sets the threshold value of the detection characteristic amount to the default value in Step S66, and the processing proceeds to Step S61.

As described above, in the case where the storage amount of the data buffer 32 of the transmission side is not equal to the proper value but within the proper range and the data buffer 32 is not so likely to overflow or underflow, the threshold value of the detection characteristic amount is set to the default value.

In the threshold value setting processing in FIG. 18, the threshold value of the detection characteristic amount is set depending on the storage amount of the data buffer 32 of the transmission side. Therefore, it can be said that generation of control information based on the results obtained by comparing the threshold value and the detection characteristic amount is performed depending on the storage amount of the data buffer 32 of the transmission side.

Note that although the threshold value of the detection characteristic amount is set to any of the three values of the default value, the default value+D, and the default value– D in FIG. 18 to make the description easy, the threshold value of the detection characteristic amount can be set to a value successively changed depending on the degree that the storage amount of the data buffer 32 is apart from the proper value.

Figure 19:
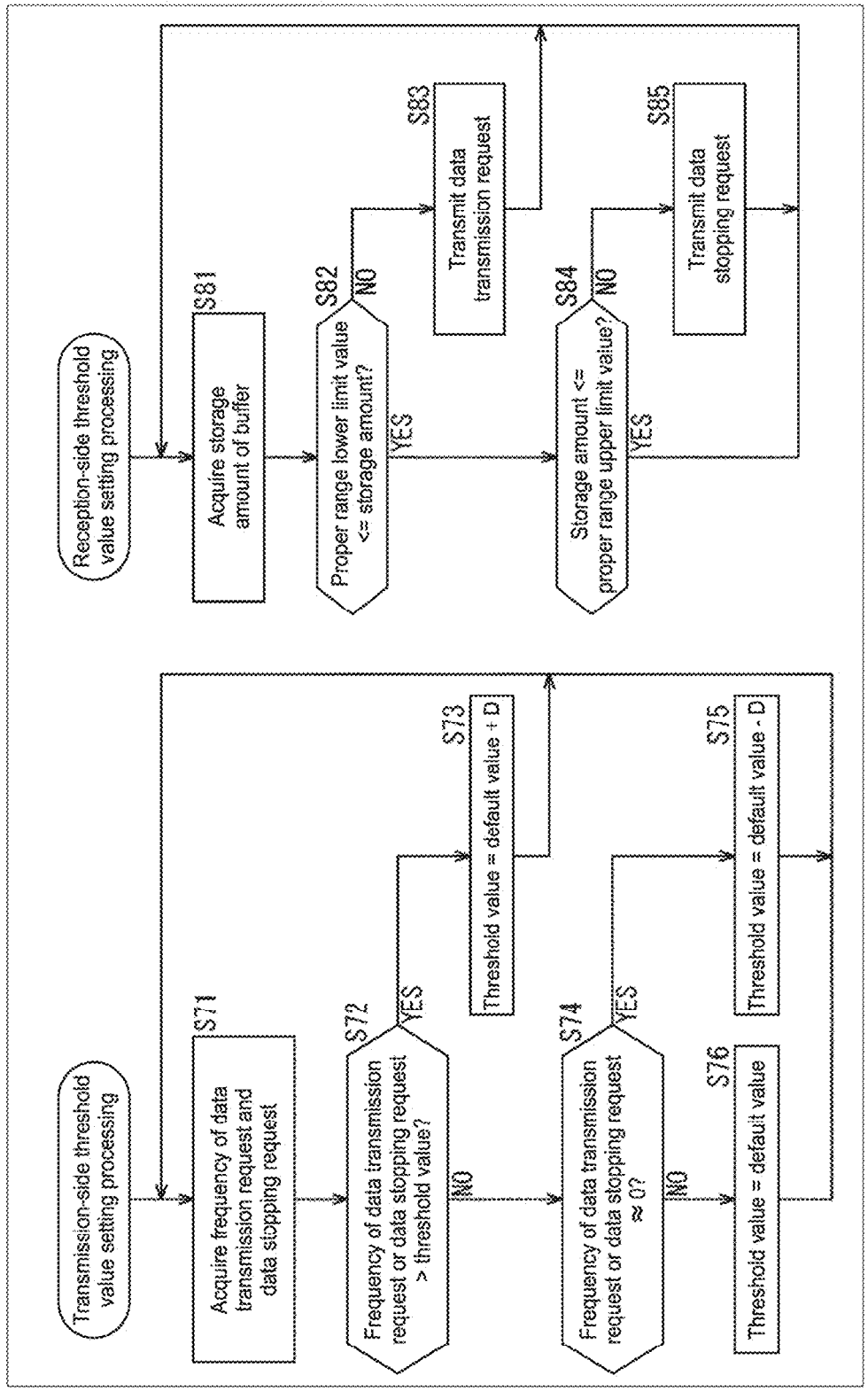
FIG. 19 A flowchart describing an example of processing of setting a second threshold value.

FIG. 19 is a flowchart describing an example of second threshold value setting processing.

The second threshold value setting processing is performed in both of the communication apparatus 12 of the transmission side and the communication apparatus 21 of the reception side. Of the (second) threshold value setting processing, the processing performed in the communication apparatus 12 is referred to also as the (second) transmission-side threshold value setting processing and the processing performed in the communication apparatus 21 is referred to also as the (second) reception-side threshold value setting processing.

First, the second reception-side threshold value setting processing performed in the communication apparatus 21 of the reception side will be described.

In the second reception-side threshold value setting processing, the data control unit 61 in the communication apparatus 21 acquires the storage amount of the data buffer 43 of the reception side in Step S81, and the processing proceeds to Step S82.

In Step S82, the data control unit 61 determines whether or not the storage amount of the data buffer 43 of the reception side is not less than the proper range lower limit value (the lower limit threshold value) that is the minimum value of the proper range in which the data buffer 43 does not overflow or underflow even when there is a somewhat rapid increase or decrease in the storage amount.

In the case where it is determined that the storage amount of the data buffer 43 is less than the proper range lower limit value, i.e., the storage amount of the data buffer 43 is small and the data buffer 43 is likely to underflow in Step S82, the processing proceeds to Step S83.

The data control unit 61 causes the communication unit 41 to transmit a data transmission request as a message for requesting for data transmission to the communication apparatus 12 of the transmission side in Step S83, and the processing returns to Step S81.

Further, in the case where it is determined that the storage amount of the data buffer 43 is not less than the proper range lower limit value in Step S82, the processing proceeds to Step S84.

In Step S84, the data control unit 61 determines whether or not the storage amount of the data buffer 43 of the reception side is not more than the proper range upper limit value (the upper limit threshold value) that is the maximum value of the proper range.

In the case where it is determined that the storage amount of the data buffer 43 is more than the proper range upper limit value, i.e., the storage amount of the data buffer 43 is large and the data buffer 43 is likely to overflow in Step S84, the processing proceeds to Step S85.

The data control unit 61 causes the communication unit 41 to transmit a data stopping request as a message for requesting for stopping data transmission to the communication apparatus 12 of the transmission side in Step S85, and the processing returns to Step S81.

Further, in the case where it is determined that the storage amount of the data buffer 43 is not more than the proper range upper limit value, i.e., the storage amount of the data buffer 43 is within the proper range in Step S84, the data control unit 61 does not transmit the data transmit request and data stopping request, and the processing returns to Step S81.

Next, the second transmission-side threshold value setting processing performed in the communication apparatus 12 of the transmission side will be described.

When the data transmission request or data stopping request is transmitted from the communication apparatus 21, the communication unit 34 in the communication apparatus 12 receives the data transmission request or data stopping request and supplies them to the control information generation unit 52.

Further, the communication unit 34 transmits data or temporarily stops data transmission in response to the data transmission request or data stopping request from the communication apparatus 21.

Then, in the second transmission-side threshold value setting processing, the control information generation unit 52 in the communication apparatus 12 acquires the frequency (number of times) of each of the data transmission request and the data stopping request transmitted from the communication apparatus 21 in the latest predetermined section in Step S71, and the processing proceeds to Step S72.

In Step S72, the control information generation unit 52 determines whether or not the frequency of the data transmission request or data stopping request is larger than (or not less than) the threshold value of the frequency.

In the case where it is determined that the data transmission request or the data stopping request is larger than the threshold value in Step S72, the processing proceeds to Step S73.

The control information generation unit 52 sets the threshold value of the detection characteristic amount to the default value+D that is a large value in Step S73, and the processing returns to Step S71.

As described above, in the case where the storage amount of the data buffer 43 of the reception side is less than the proper range lower limit value or where the data buffer 43 of the reception side is likely to overflow or underflow and the data transmission request or data stopping request is frequently transmitted because the storage amount is not less than the proper range lower limit value, the threshold value of the detection characteristic amount is set to the default value+D that is a large value. As a result, control information that represents acceptance of insertion and discard of data is likely to be generated to prevent the data buffer 43 of the reception side from overflowing or underflowing.

On the other hand, in the case where it is determined that the frequency of the data transmission request or data stopping request is not larger than the threshold value in Step S72, the processing proceeds to Step S74.

In Step S74, the control information generation unit 52 determines whether or not the frequency of each of the data transmission request and the data stopping request is equal to (including substantially equal to and can be regarded as being equal to) 0.

In the case where it is determined that the frequency of each of the data transmission request and the data stopping request is equal to 0 in Step S74, the processing proceeds to Step S75.

The control information generation unit 52 sets the threshold value of the detection characteristic amount to the default value− D that is a small value in Step S75, and the processing returns to Step S71.

As described above, in the case where the frequency of each of the data transmission request and the data stopping request is equal to 0 and the data buffer 43 of the reception side is unlikely to overflow or underflow, the threshold value of the detection characteristic amount is set to the default value− D that is a small value. As a result, control information that represents prohibition of insertion and discard of data is likely to be generated to prevent insertion and discard of data from being frequently performed in the communication apparatus 21 of the reception side.

Further, in the case where it is determined that the frequency of at least any one of the data transmission request and the data stopping request is not equal to 0, i.e., the frequency of the data transmission request or data stopping request is not larger than the threshold value but has a value close to the threshold value, for example, in Step S74, the processing proceeds to Step S76.

The control information generation unit 52 sets the threshold value of the detection characteristic amount to the default value in Step S76, and the processing proceeds to Step S71.

As described above, in the case where the frequency of the data transmission request or data stopping request is not equal to 0 but not more than the threshold value and the data buffer 32 is not so likely to overflow or underflow, the threshold value of the detection characteristic amount is set to the default value.

In the threshold value setting processing in FIG. 19, because the threshold value of the detection characteristic amount is set depending on the frequency of the data transmission request or data stopping request, it can be said that generation of control information based on the results obtained by comparing the threshold value and the detection characteristic amount is performed depending on the frequency of the data transmission request or data stopping request.

Further, in the threshold value setting processing in FIG. 19, because the data transmission request and the data stopping request are transmitted from the communication apparatus 21 to the communication apparatus 12 depending on the storage amount of the data buffer 43 of the reception side, it can be said that the generation of control information is performed depending on the storage amount of the data buffer 43 of the reception side.

Note that although the threshold value of the detection characteristic amount is set to any of the three values of the default value, the default value+D, and the default value− D in FIG. 19 to make the description easy, the threshold value of the detection characteristic amount can be set to a value successively changed depending on the frequency of the data transmission request or data stopping request, and then, the storage amount of the data buffer 43.

Figure 20:
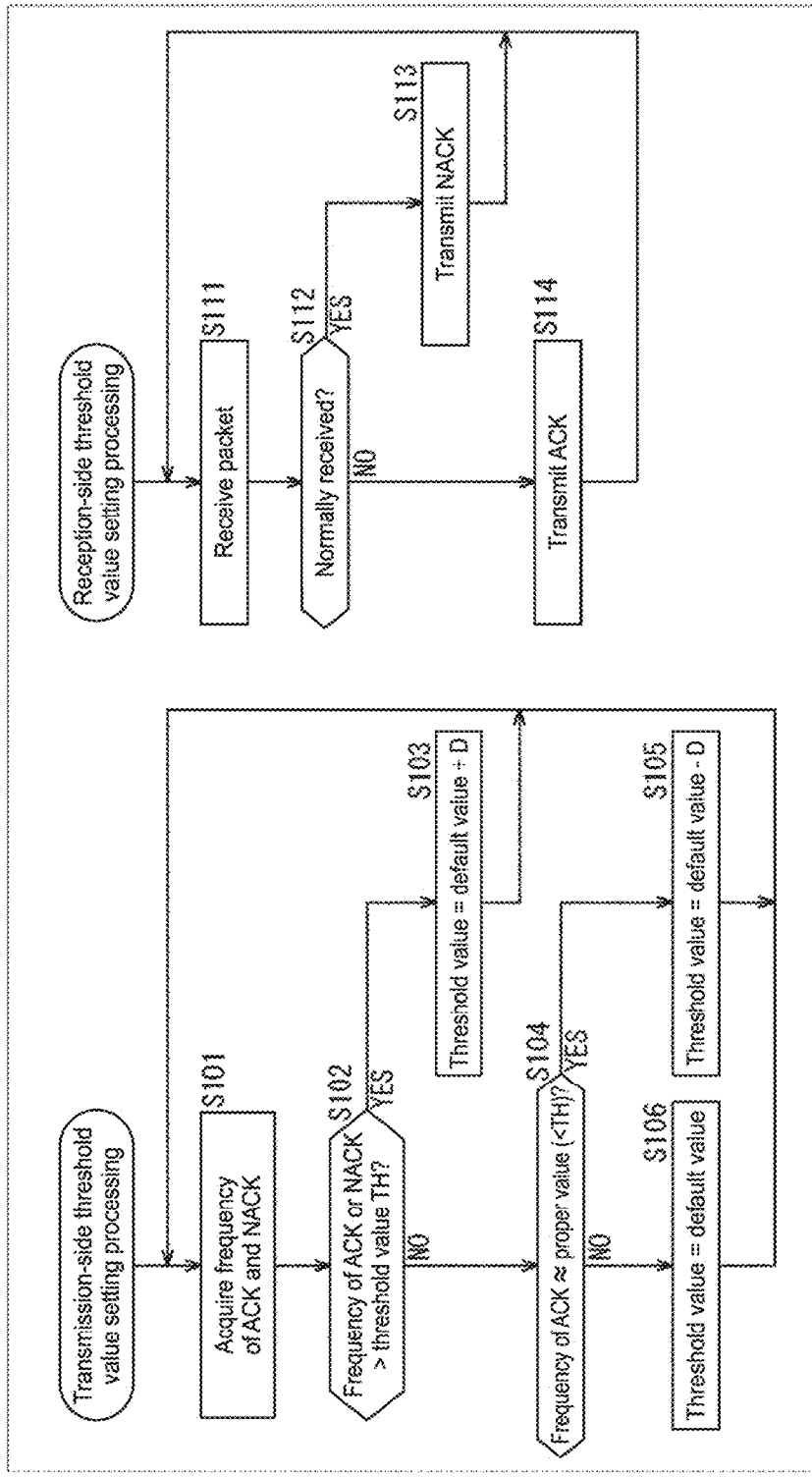
FIG. 20 A flowchart describing an example of processing of setting a third threshold value.

FIG. 20 is a flowchart describing an example of third threshold value setting processing.

The third threshold value setting processing includes the (third) transmission-side threshold value setting processing performed in the communication apparatus 12 of the transmission side and the (third) reception-side threshold value setting processing performed in the communication apparatus 21 of the reception side, similarly to the second threshold value setting processing.

First, the third reception-side threshold value setting processing performed in the communication apparatus 21 of the reception side will be described.

In the third reception-side threshold value setting processing, the communication unit 41 in the communication apparatus 21 stands by for transmission of (an RF signal) of a packet from (the communication unit 34 in) the communication apparatus 12 and receives it in Step S111, and the processing proceeds to Step S112.

In Step S112, the communication unit 41 determines whether or not the packet from the communication apparatus 12 can be normally received.

In the case where it is determined that the packet from the communication apparatus 12 cannot be normally received in Step S112, the processing proceeds to Step S113.

The communication unit 41 transmits NACK (Negative Acknowledgement) that is a message indicating that the packet cannot be normally received to the communication apparatus 12 in Step S113, and the processing returns to Step S111.

Further, in the case where it is determined that the packet from the communication apparatus 12 can be normally received in Step S112, the processing proceeds to Step S114.

The communication unit 41 transmits ACK (Acknowledgement) indicating that the packet can be normally received to the communication apparatus 12 in Step S114, the processing returns to Step S111.

Next, the third transmission-side threshold value setting processing performed in the communication apparatus 12 of the transmission side will be described.

When ACK or NACK is transmitted from the communication apparatus 21, the communication unit 34 in the communication apparatus 12 receives the ACK or NACK and supplies it to the control information generation unit 52.

Further, the communication unit 34 transmits (the RF signal of) the next packet or retransmits the previously transmitted packet depending on the ACK or NACK from the communication apparatus 21.

Then, in the third transmission-side threshold value setting processing, the control information generation unit 52 in the communication apparatus 12 acquires the frequency (number of times) of each of the ACK and NACK transmitted from (the communication apparatus 21 in) the communication apparatus 21 in the latest predetermined section in Step S101, and the processing proceeds to Step S102.

In Step S102, the control information generation unit 52 determines whether or not the frequency of ACK or NACK is larger than (or not less than) a threshold value TH of the frequency.

In the case where it is determined that ACK or NACK is larger than the threshold value TH in Step S102, the processing proceeds to Step S103.

The control information generation unit 52 sets the threshold value of the detection characteristic amount to the default value+D that is a large value in Step S103, and the processing returns to Step S101.

As described above, in the case where the frequency of ACK or NACK is large, i.e., the frequency of packets that have been normally received or packets that have not been normally received is large in the communication apparatus 21 of the reception side and therefore the storage amount of the data buffer 43 of the reception side is large or small and the data buffer 43 of the reception side is expected to be likely to overflow or underflow, the threshold value of the detection characteristic amount is set to the default value+D that is a large value. As a result, control information that represents acceptance of insertion and discard of data is likely to be generated to prevent the data buffer 43 of the reception side from overflowing or underflowing.

On the other hand, in the case where it is determined that the frequency of each of the ACK and NACK is not larger than the threshold value TH in Step S102, the processing proceeds to Step S104.

In Step S104, the control information generation unit 52 determines whether or not the frequency of ACK is equal to (including substantially equal to and can be regarded as being equal to) the proper value of the frequency.

Note that the proper value of the frequency of ACK is the frequency of ACK at the time when packets are normally received in the communication apparatus 21 to the degree that the storage amount of the data buffer 43 of the reception side is equal to the proper value, for example, and is a value smaller than the threshold value TH of the frequency of ACK.

In the case where it is determined that the frequency of ACK is equal to the proper value in Step S104, the processing proceeds to Step S105.

The control information generation unit 52 sets the threshold value of the detection characteristic amount to the default value– D that is a small value in Step S105, and the processing returns to Step S101.

As described above, in the case where the frequency of ACK is equal to the proper value, the storage amount of the data buffer 43 of the reception side is the proper value, and therefore, the data buffer 43 of the reception side is expected to be unlikely to overflow or underflow, the threshold value of the detection characteristic amount is set to the default value– D that is a small value. As a result, in the control information generation unit 52, control information that represents prohibition of insertion and discard of data is likely to be generated to prevent insertion or discard of data from being frequently performed in the communication apparatus 21 of the reception side.

Further, in the case where it is determined that the frequency of ACK is not equal to the proper value, i.e., the frequency of ACK is not larger than the threshold value TH and not equal to the proper value, for example, in Step S104, the processing proceeds to Step S106.

The control information generation unit 52 sets the threshold value of the detection characteristic amount to the default value in Step S106, and the processing returns to Step S101.

As described above, in the case where the frequency of ACK is not equal to the proper value, is not more than the threshold value TH, and the data buffer 32 is expected not to be so likely to overflow or underflow, the threshold value of the detection characteristic amount is set to the default value.

In the threshold value setting processing in FIG. 20, because the threshold value of the detection characteristic amount is set depending on the frequency of ACK or NACK, it can be said that generation of control information based on the results obtained by comparing the threshold value and the detection characteristic amount is performed depending on the frequency of ACK or NACK.

Further, it can be said that the frequency of each of the ACK and NACK represents the state of the wireless transmission path through which (the RF signal of) the packet is transmitted from the communication apparatus 12 to the communication apparatus 21.

Therefore, it can be said that the generation of control information based on the results obtained by comparing the threshold value set in the threshold value setting processing in FIG. 20 and the detection characteristic amount is performed depending on the state of the wireless transmission path between the communication apparatus 12 and the communication apparatus 21.

Note that although the threshold value of the detection characteristic amount is set to any of the three values of the default value, the default value+D, and the default value– D in FIG. 20 to make the description easy, the threshold value of the detection characteristic amount can be set to a value successively changed depending on the frequency of ACK or NACK, and then, the state of the wireless transmission path.

<Generation Processing of Data-with-Control-Information>

Figure 21:
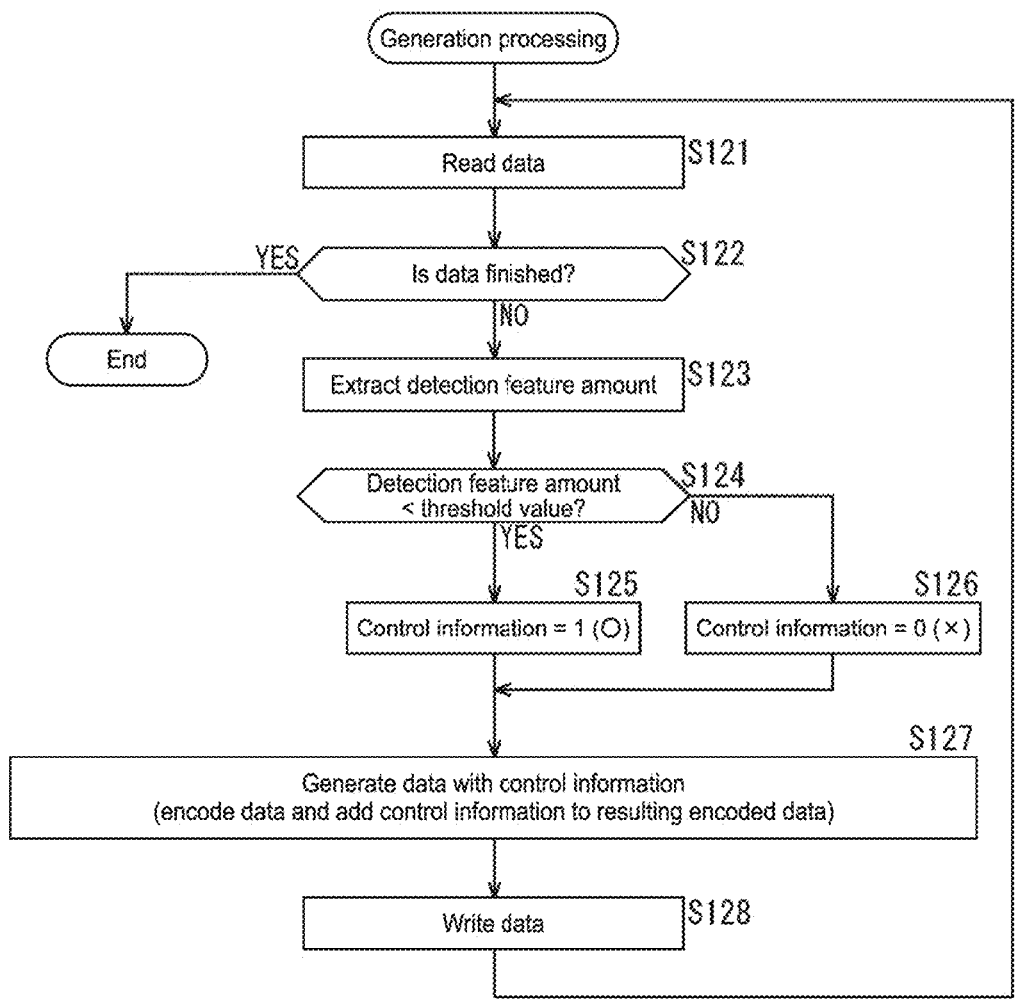
FIG. 21 A flowchart describing an example of processing of generating data-with-control-information performed by the communication apparatus 12.

FIG. 21 is a flowchart describing an example of generation processing of data-with-control-information performed in the communication apparatus 12 in FIG. 7.

In the communication apparatus 12, as described in the transmission processing in FIG. 16, it is possible to generate data-with-control-information from acoustic data and immediately transmit it to the communication apparatus 21.

In addition, in the communication apparatus 12, it is possible to generate data-with-control-information from acoustic data in advance and transmit the data-with-control-information generated in advance to the communication apparatus 21 at necessary timing.

FIG. 21 is a flowchart describing the generation processing of the data-with-control-information performed in the communication apparatus 12 in the case where the data-with-control-information is generated in advance.

Note that assumption is made that acoustic data (LPCM data) is stored (recorded) in a recording medium (not shown) in, for example the form of file in the supplying apparatus 11, here.

The data generation unit 51 performs reading of LPCM data in one frame from the file stored in the recording medium (not shown) in the supplying apparatus 11 in Step S121, and the processing proceeds to Step S122.

In Step S122, the data generation unit 51 determines whether or not the LPCM data of the file stored in the supplying apparatus 11 is finished.

In the case where it is determined that the LPCM data of the file stored in the supplying apparatus 11 is not finished in Step S122, the data generation unit 51 supplies the LPCM data from the supplying apparatus 11to the control information generation unit 52, and the processing proceeds to Step S123.

After that, the processing similar to that in Steps S12 to S16 in FIG. 17 is respectively performed in Steps S123 to S127, and data-with-control-information is generated in the data generation unit 51.

Then, the data generation unit 51 writes the data-with-control-information in a file (a new file different from the file of the LPCM data) of the recording medium (not shown) in the supplying apparatus 11 in Step S128, and the processing returns to Step S121.

After that, the processing in Steps S121 to S128 is repeated, and the generation processing is finished in the case where it is determined that the LPCM data of the file stored in the supplying apparatus 11 is finished in Step S122.

In the case where the data-with-control-information generated in the generation processing in FIG. 21 is supplied from the supplying apparatus 11 to the communication apparatus 12, the data-with-control-information from the supplying apparatus 11 is temporarily stored in the data buffer 32 via the data generation unit 51 in the communication apparatus 12, and transmitted via the packetizing unit 33 and the communication unit 34 thereafter.

Further, although data-with-control-information is generated in the generation processing in FIG. 21, not the data-with-control-information but the control information may be generated and stored in the supplying apparatus 11 in relation to the LPCM data used for generating the control information in the generation processing.

In this case, by acquiring encoded data by encoding LPCM data before adding control information associated with the LPCM data to the encoded data, it is possible to generate data-with-control-information and transmit it.

Note that although acoustic data is employed as the target to be wirelessly transmitted/received in this embodiment, the present technology can be applied also to the case where image data is wirelessly transmitted/received, in addition to the acoustic data. In the case where image data is wirelessly transmitted/received, it is possible to add control information of 1 to image data of a screen with a substantially one color, for example, and add control information of 0 to other image data.

Further, although Bluetooth (registered trademark) is employed as the wireless communication system for wirelessly transmitting/receiving acoustic data in this embodiment, the wireless communication system is not limited to Bluetooth (registered trademark).

Further, although data is wirelessly transmitted/received in this embodiment, the present technology can be applied also to the case where data is transmitted/received by wire.

Further, although acoustic data is encoded and decoded by an SBC in this embodiment, the method of encoding and decoding acoustic data is not limited to the SBC, and MP3 (MPEG-1 Audio Layer-3), AAC (Advanced Audio Coding), ATRAC (Adaptive Transform Acoustic Coding), and another codec that uses a time coding method or transform coding method can be employed, for example.

Note that the codec that uses a time coding method represents, for example, a codec that uses a difference in a time direction by a method of encoding/decoding time-domain data in the time-domain. The codec that uses a transform coding method represents, for example, a codec that performs a Fourier transform by a method of encoding/decoding time-domain data by transforming it to another domain such as a frequency domain.

Further, although acoustic data is encoded and decoded in this embodiment, it does not necessarily need to encode and decode the acoustic data.

Further, although data-with-control-information is stored in the data buffer 43 in the communication apparatus 21 in this embodiment, only encoded data in data-with-control-information may be stored in the data buffer 43, and control information in the data-with-control-information may be stored in a storage unit (not shown) different from the data buffer 43.

<Description of Computer to which Present Technology is Applied>

Next, the series of processing performed by the data generation unit 51 and the control information generation unit 52 in the communication apparatus 12 and the series of processing performed by the data control unit 61 and the data output unit 62 in the communication apparatus 21 may be performed by hardware or may be performed by software. In the case where the series of processing is performed by software, a program configuring the software is installed in a general-purpose computer or the like.

Figure 22:
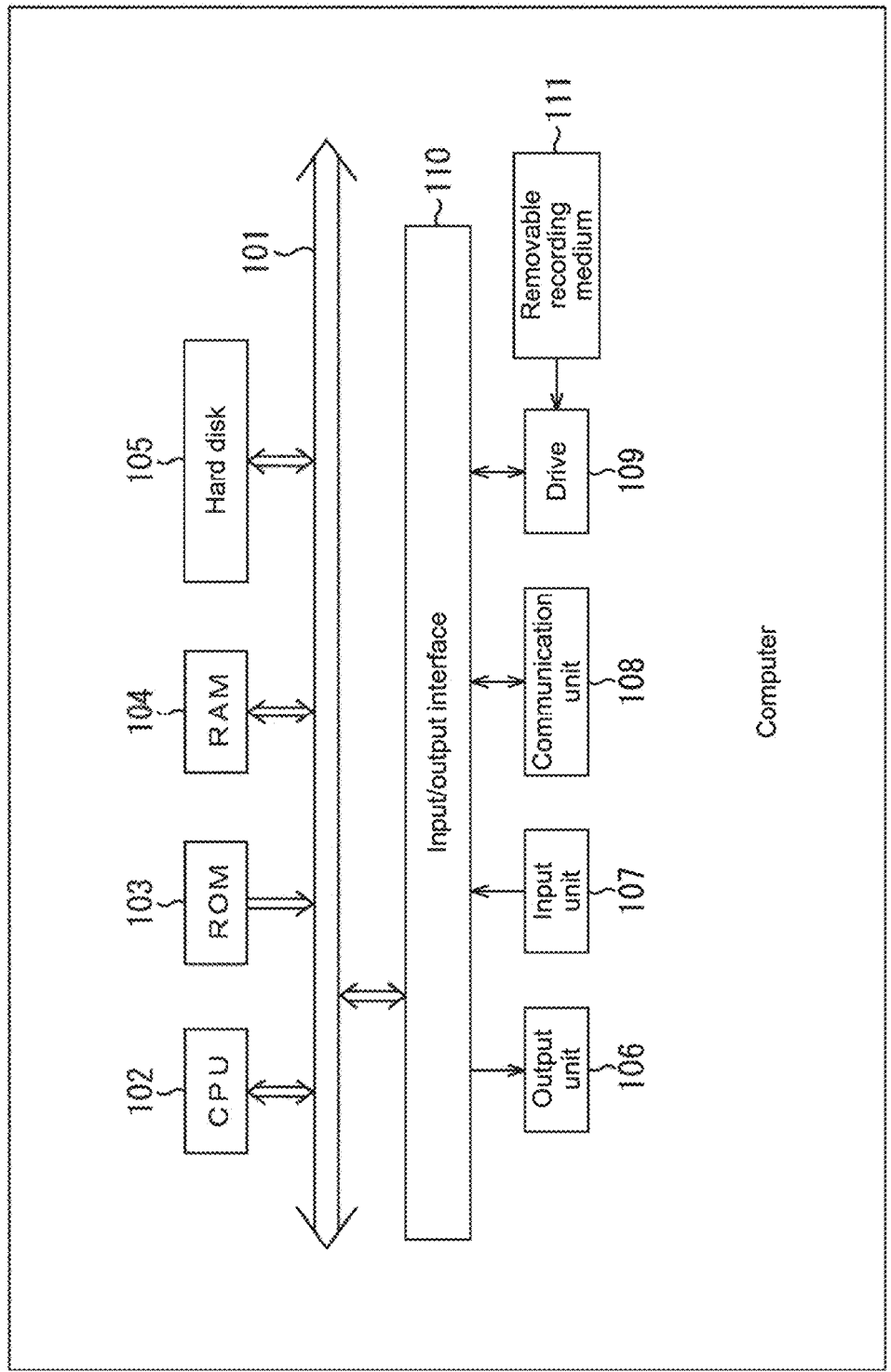
FIG. 22 A block diagram showing a configuration example of an embodiment of a computer to which the present technology is applied.

In this regard, FIG. 22 shows a configuration example of an embodiment of a computer in which the program for performing the above-mentioned series of processing is installed.

The program may be stored in advance in a hard disk 105 or a ROM 103 as a recording medium incorporated in the computer.

Alternatively, the program may be stored (recorded) in a removable recording medium 111. Such a removable recording medium 111 may be provided as so-called package software. Examples of the removable recording medium 111 include a flexible disc, a CD-ROM (Compact Disc Read Only Memory), an MO (Magneto Optical) disc, a DVD (Digital Versatile Disc), a magnetic disk, and a semiconductor memory.

Note that the program may be, in addition to being installed in the computer from the removable recording medium 111 as described above, downloaded into the computer via a communication network or a broadcast network and installed in the built-in hard disk 105. In other words, the program may be wirelessly transferred to the computer, for example, from a download site via a satellite for digital terrestrial broadcasting or may be transferred to the computer via a network such as a LAN (local area network) and the Internet by wire.

The computer includes a built-in CPU (Central Processing Unit) 102. An input/output interface 110 is connected to the CPU 102 via the bus 101.

When an instruction is input by, for example, a user operating an input unit 107 via the input/output interface 110, the CPU 102 executes the program stored in a ROM (Read Only Memory) 103 according to the input. Alternatively, the CPU 102 loads the program stored in the hard disk 105 into a RAM (Random Access Memory) 104 and executes the program.

With this, the CPU 102 performs processing according to the above-mentioned flowchart or processing to be performed by the components of the block diagram described above. Then, the CPU 102 outputs the processing result from an output unit 106, transmits the processing result from a communication unit 108, or records the processing result in the hard disk 105 via the input/output interface 110, as necessary, for example.

Note that the input unit 107 includes a keyboard, a mouse, a microphone, and the like. Further, the output unit 106 includes an LCD (Liquid Crystal Display), a speaker, and the like.

Here, the processing performed by the computer according to the program does not necessarily need to be chronologically performed following the order described as the flowchart in the specification. In other words, the processing performed by the computer according to the program includes also processing to be performed in parallel or individually (e.g., parallel processing or object processing).

Further, the program may be processed by a single computer (processor) or may be subjected to distribution processing by a plurality of computers. In addition, the program may be transferred to a remote computer and executed.

In addition, in the specification, the system means the assembly of components (apparatuses, modules (parts) or the like). All the components do not need to be provided in the same casing. Therefore, both of a plurality of apparatuses that are provided in separate casings and connected via a network and a single apparatus including a plurality of modules housed in a single casing serve as the system.

Note that the embodiments of the present technology are not limited to the above-mentioned embodiments and may be variously modified without departing from the essence of the present technology.

For example, the present technology may take a cloud computing configuration in which a single function is shared with a plurality of apparatuses via a network and commonly processed.

Further, the above-mentioned steps in the flowchart may be performed by a single apparatus or may be shared with and performed by a plurality of apparatuses.

In addition, if a single step includes a plurality of processes, the plurality of processes included in the single step may be, in addition to be performed by a single apparatus, shared with and performed by a plurality of apparatuses.

Further, the effects described in the specification are merely examples and not limited, and additional effects may be provided.

It should be noted that the present technology may take the following configurations.

<1>
A data processing apparatus, including:
a control information generation unit that generates control information for controlling a method of using data by a reception side, the data being wirelessly transmitted and received by the reception side; and
a data generation unit that adds the control information to data to generate data-with-control-information.

<2>
The data processing apparatus according to <1>, in which
the control information is information related to acceptance or prohibition of insertion of data, acceptance or prohibition of discard of data, or acceptance or prohibition of insertion and discard of data on the reception side.

<3>
The data processing apparatus according to <2>, in which
the control information is
a flag that represents acceptance or prohibition of insertion of data, acceptance or prohibition of discard of data, or acceptance or prohibition of insertion and discard of data on the reception side, or
information that represents a level of acceptance or prohibition of insertion of data, a level of acceptance or prohibition of discard of data, or a level of acceptance or prohibition of insertion and discard of data on the reception side.

<4>
The data processing apparatus according to any one of <1> to <3>, in which
the data-with-control-information is stored in a buffer and transmitted, and
the control information generation unit generates the control information depending on a storage amount of the buffer.

<5>
The data processing apparatus according to any one of <1> to <3>, in which
the data-with-control-information is received by the reception side and stored in a buffer, and
the control information generation unit generates the control information depending on a storage amount of the buffer of the reception side.

<6>
The data processing apparatus according to any one of <1> to <3>, in which
the control information generation unit generates the control information depending on a state of a wireless transmission path, data being transmitted through the wireless transmission path.

<7>
The data processing apparatus according to any one of <1> to <6>, in which
the control information generation unit generates the control information on the basis of a characteristic amount when insertion or discard of data is performed by the reception side, the characteristic amount representing a degree that the insertion or discard of the data is detected.

<8>
The data processing apparatus according to any one of <1> to <7>, in which
the control information is information for controlling the number of use of data by the reception side.

<9>
A data processing method, including:
generating control information for controlling a method of using data on a reception side, the data being wirelessly transmitted and received by the reception side; and
adding the control information to data to generate data-with-control-information.

<10>
A program, that causes a computer to function as:
a control information generation unit that generates control information for controlling a method of using data by a reception side, the data being wirelessly transmitted and received by the reception side; and
a data generation unit that adds the control information to data to generate data-with-control-information.

<11>
A data processing apparatus, including:
a data control unit that controls a method of using data on the basis of control information included in data-with-control-information for controlling the method of using data, the data-with-control-information being acquired by adding the control information to data, the data-with-control-information being wirelessly transmitted; and
a data output unit that outputs data whose use method is controlled, on the basis of the control information.

<12>
The data processing apparatus according to <11>, in which
the control information is information related to acceptance or prohibition of insertion of data, acceptance or prohibition of discard of data, or acceptance or prohibition of insertion and discard of data.

<13>
The data processing apparatus according to <12>, in which
the control information is
a flag that represents acceptance or prohibition of insertion of data, acceptance or prohibition of discard of data, or acceptance or prohibition of insertion and discard of data, or
information that represents a level of acceptance or prohibition of insertion of data, a level of acceptance or prohibition of discard of data, or a level of acceptance or prohibition of insertion and discard of data.

<14>
The data processing apparatus according to <12> or <13>, in which
the data control unit performs insertion of data to which the control information is added by copying the data, on the basis of the control information.

<15>
The data processing apparatus according to <12> or <13>, in which
the data is acoustic data, and
the data control unit performs insertion of silent data or noise data as the insertion of data.

<16>
The data processing apparatus according to any one of <11> to <15>, in which
the data-with-control-information is stored in a buffer,
the data output unit outputs the data stored in the buffer, and
the data control unit controls the method of using data on the basis of the control information and a storage amount of the buffer.

<17>

The data processing apparatus according to <16>, in which the data control unit controls the method of using data on the basis of the control information and the storage amount of the buffer where a predetermined condition is satisfied.

<18>

The data processing apparatus according to any one of <11> to <17>, in which the control information is information for controlling the number of use of data.

<19>

A data processing method, including:

controlling a method of using data on the basis of control information included in data-with-control-information for controlling the method of using data, the data-with-control-information being acquired by adding the control information to data, the data-with-control-information being wirelessly transmitted; and outputting data whose use method is controlled, on the basis of the control information.

<20>

A program that causes a computer to function as:

a data control unit that controls a method of using data on the basis of control information included in data-with-control-information for controlling the method of using data, the data-with-control-information being acquired by adding the control information to data, the data-with-control-information being wirelessly transmitted; and a data output unit that outputs data whose use method is controlled, on the basis of the control information.

REFERENCE SIGNS LIST 10 transmission apparatus
11 supplying apparatus
12 communication apparatus
20 reception apparatus
21 communication apparatus
22 output apparatus
31 encoder
32 data buffer
33 packetizing unit
34, 41 communication unit
42 packet decomposing unit
43 data buffer
44 decoder
45 LPCM buffer
46 speed control unit
51 data generation unit
52 control information generation unit
61 data control unit
62 data output unit
101 bus
102 CPU
103 ROM
104 RAM
105 hard disk
106 output unit
107 input unit
108 communication unit
109 drive
110 input/output interface
111 removable recording medium

The invention claimed is:

1. A data processing apparatus comprising:
a data control unit configured to control a process of using data based on control information associated with the data, the data and the associated control information being wirelessly received; and
a data output unit configured to output the data whose use is controlled, based on the control information;
wherein the control information used to control the process of using data is based on a characteristic amount representative of a characteristic of the data and wherein the data includes LPCM (Linear Pulse Code Modulation) data and the characteristic amount is generated from results of processing performed on a frame of the LPCM data acquired when SBC (Subband Code) encoding is performed on a transmission side.

2. The data processing apparatus according to claim 1, wherein the process of using data includes loading all or part of the data into a buffer.

3. A data processing method comprising:
controlling a process of using data based on control information associated with the data, the data and the associated control information being wirelessly received; and
outputting the data whose use is controlled, based on the control information;
wherein the control information used to control the process of using data is based on a characteristic amount representative of a characteristic of the data and wherein the data includes LPCM (Linear Pulse Code Modulation) data and the characteristic amount is generated from results of processing performed on a frame of the LPCM data acquired when SBC (Subband Code) encoding is performed on a transmission side.

4. The data processing method according to claim 3, wherein the process of using data includes loading all or part of the data into a buffer.

5. A non-transitory computer-readable medium containing instructions that, when executed by a processing device, implement:
a data control unit configured to control a process of using data based on control information associated with the data, the data and the associated control information being wirelessly received; and
a data output unit configured to output the data whose use is controlled, based on the control information;
wherein the control information used to control the process of using data is based on a characteristic amount representative of a characteristic of the data and wherein the data includes LPCM (Linear Pulse Code Modulation) data and the characteristic amount is generated from results of processing performed on a frame of the LPCM data acquired when SBC (Subband Code) encoding is performed on a transmission side.

6. A data processing apparatus comprising:
a control information generation unit configured to generate control information for controlling use of data by a reception side and to associate the control information with the data; and
a transmission unit configured to wirelessly transmit the data and the associated control information to the reception side,
wherein the control information for controlling use of data by the reception side is based on a characteristic amount representative of a characteristic of the data and wherein the data includes LPCM (Linear Pulse Code Modulation) data and the characteristic amount is generated from results of processing performed on a frame of the LPCM data acquired when SBC (Subband Code) encoding is performed on a transmission side.

7. A data processing method comprising:

generating control information for controlling use of data by a reception side and associating the control information with the data; and wirelessly transmitting the data and the associated control information to the reception side, wherein the control information for controlling use of data by the reception side is based on a characteristic amount representative of a characteristic of the data and wherein the data includes LPCM (Linear Pulse Code Modulation) data and the characteristic amount is generated from results of processing performed on a frame of the LPCM data acquired when SBC (Subband Code) encoding is performed on a transmission side.

8. A non-transitory computer-readable medium containing instructions that, when executed by a processing device, implement:

a control information generation unit configured to generate control information for controlling use of data by a reception side and to associate the control information with the data; and a transmission unit configured to wirelessly transmit the data and the associated control information to the reception side, wherein the control information for controlling use of data by the reception side is based on a characteristic amount representative of a characteristic of the data and wherein the data includes LPCM (Linear Pulse Code Modulation) data and the characteristic amount is generated from results of processing performed on a frame of the LPCM data acquired when SBC (Subband Code) encoding is performed on a transmission side.

* * * * *